US009473794B2

(12) United States Patent
Song et al.

(10) Patent No.: US 9,473,794 B2
(45) Date of Patent: *Oct. 18, 2016

(54) DIGITAL BROADCASTING RECEIVER AND METHOD FOR CONTROLLING THE SAME

(71) Applicant: LG Electronics Inc., Seoul (KR)

(72) Inventors: Jae Hyung Song, Seoul (KR); In Hwan Choi, Gwacheon-si (KR); Jong Yeul Suh, Seoul (KR); Jin Pil Kim, Seoul (KR); Chul Soo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/918,226

(22) Filed: Oct. 20, 2015

(65) Prior Publication Data

US 2016/0044347 A1 Feb. 11, 2016

Related U.S. Application Data

(63) Continuation of application No. 14/496,871, filed on Sep. 25, 2014, now Pat. No. 9,241,175, which is a continuation of application No. 14/069,202, filed on Oct. 31, 2013, now Pat. No. 8,880,984, which is a (Continued)

(30) Foreign Application Priority Data

Sep. 19, 2008 (KR) .................... 10-2008-0092446

(51) Int. Cl.
*H03M 13/00* (2006.01)
*H04N 21/236* (2011.01)
(Continued)

(52) U.S. Cl.
CPC ........ *H04N 21/23614* (2013.01); *H04H 20/30* (2013.01); *H04H 20/57* (2013.01);
(Continued)

(58) Field of Classification Search
CPC ...... H04H 20/30; H04H 20/55; H04H 20/57; H04N 21/2383; H04N 21/6131; H04N 21/235; H04N 21/2347; H04N 21/23611; H04N 21/26603; H04L 9/30
See application file for complete search history.

(56) References Cited

U.S. PATENT DOCUMENTS 6,049,651 A 4/2000 Oshima
6,211,800 B1 4/2001 Yanagihara et al.
(Continued)

FOREIGN PATENT DOCUMENTS

EP 1211822 6/2002
EP 1689103 8/2006
(Continued)

OTHER PUBLICATIONS

Uehara,. M. et al: "Transmission Scheme for the Terrestrial ISDB System." IEEE Transaction on Consumer Electronics. Feb. 1999, vol. 45, No. 1, pp. 101-106.
(Continued)

*Primary Examiner* — Guy Lamarre
(74) *Attorney, Agent, or Firm* — Lee Hong Degerman Kang & Walmey; Jonathan Kang; Jeffrey Lotspeich

(57) ABSTRACT

According to one embodiment, a method of processing broadcast data in a broadcast transmitter includes: encoding the broadcast data for broadcast service; encoding signaling information for signaling the broadcast data; assigning the encoded broadcast data and the encoded signaling information into a signal frame; and transmitting a broadcast signal including the signal frame. The broadcast signal further includes a signaling table having access information of the broadcast data. The signaling table includes service id information for identifying the broadcast service and component information for indicating a number of components in the broadcast service.

8 Claims, 35 Drawing Sheets

Related U.S. Application Data continuation of application No. 12/699,022, filed on Feb. 2, 2010, now Pat. No. 8,589,772, which is a continuation of application No. 12/235,572, filed on Sep. 22, 2008, now Pat. No. 7,813,310.

(60) Provisional application No. 60/974,084, filed on Sep. 21, 2007, provisional application No. 60/980,165, filed on Oct. 15, 2007, provisional application No. 60/977,379, filed on Oct. 4, 2007, provisional application No. 61/044,504, filed on Apr. 13, 2008, provisional application No. 61/076,686, filed on Jun. 29, 2008.

(51) Int. Cl.
| | | |
|---|---|---|
| *H04H 20/30* | (2008.01) | |
| *H04H 20/57* | (2008.01) | |
| *H04N 21/2383* | (2011.01) | |
| *H04N 21/266* | (2011.01) | |
| *H04N 21/2347* | (2011.01) | |
| *H04N 21/61* | (2011.01) | |
| *H04N 21/81* | (2011.01) | |
| *H04H 20/55* | (2008.01) | |
| *H04L 9/30* | (2006.01) | |

(52) U.S. Cl.
CPC ...... *H04N21/2347* (2013.01); *H04N 21/2383* (2013.01); *H04N 21/23605* (2013.01); *H04N 21/23611* (2013.01); *H04N 21/26603* (2013.01); *H04N 21/6131* (2013.01); *H04N 21/8126* (2013.01); *H04H 20/55* (2013.01); *H04L 9/30* (2013.01)

(56) References Cited

U.S. PATENT DOCUMENTS

| | | |
|---|---|---|
| 6,373,534 B1 | 4/2002 | Yasuki et al. |
| 6,512,759 B1 | 1/2003 | Hashimoto et al. |
| 6,680,952 B1 | 1/2004 | Berg et al. |
| 6,686,880 B1 | 2/2004 | Marko et al. |
| 6,810,084 B1 | 10/2004 | Jun et al. |
| 6,931,198 B1 | 8/2005 | Hamada et al. |
| 6,975,689 B1 | 12/2005 | McDonald et al. |
| 6,985,537 B1 | 1/2006 | Milbar et al. |
| 7,096,484 B2 | 8/2006 | Mao et al. |
| 7,151,575 B1 | 12/2006 | Landry et al. |
| 7,813,310 B2 | 10/2010 | Song et al. |
| 8,589,772 B2 | 11/2013 | Song et al. |
| 8,776,143 B2 | 7/2014 | Yoo et al. |
| 8,880,984 B2 | 11/2014 | Song et al. |
| 8,914,830 B2 | 12/2014 | Park et al. |
| 9,241,175 B2 * | 1/2016 | Song ............... H04H 20/30 |
| 2002/0194570 A1 | 12/2002 | Birru et al. |
| 2005/0024543 A1 | 2/2005 | Ramaswamy |
| 2005/0157758 A1 | 7/2005 | Yoo |
| 2006/0007953 A1 | 1/2006 | Vesma et al. |
| 2006/0126757 A1 | 6/2006 | Choi et al. |
| 2006/0248563 A1 | 11/2006 | Lee et al. |
| 2007/0086488 A1 | 4/2007 | Kim et al. |
| 2007/0093943 A1 | 4/2007 | Nelson et al. |
| 2007/0121681 A1 | 5/2007 | Kang et al. |
| 2007/0206590 A1 | 9/2007 | Baek et al. |
| 2007/0258487 A1 | 11/2007 | Puputti |
| 2007/0281613 A1 | 12/2007 | Lee et al. |
| 2010/0138727 A1 | 6/2010 | Song et al. |
| 2015/0113583 A1 | 4/2015 | Song et al. |

FOREIGN PATENT DOCUMENTS

| | | |
|---|---|---|
| JP | 11261906 | 9/1999 |
| JP | 2003101812 | 4/2003 |
| JP | 2004-505554 | 2/2004 |
| JP | 2004-140811 | 5/2004 |
| JP | 2005094354 | 4/2005 |
| JP | 2007-010368 | 1/2007 |
| JP | 2007-096403 | 4/2007 |
| KR | 102003078354 | 10/2003 |
| KR | 10-2004-0006024 | 1/2004 |
| KR | 10-2004-0074345 | 8/2004 |
| KR | 10-0466237 | 1/2005 |
| KR | 10-2005-0065898 | 6/2005 |
| KR | 10-2005-0121504 | 12/2005 |
| KR | 10-2006-0062464 | 6/2006 |
| KR | 10-2006-0063258 | 6/2006 |
| KR | 1020060072573 | 6/2006 |
| KR | 10-2006-0088622 | 8/2006 |
| KR | 1020060112499 | 11/2006 |
| KR | 10-0661005 | 12/2006 |
| KR | 10-2007-0021462 | 2/2007 |
| KR | 10-2007-0032558 | 3/2007 |
| KR | 10-2007-0040696 | 4/2007 |
| KR | 10-2007-0043587 | 4/2007 |
| KR | 10-0724891 | 5/2007 |
| KR | 10-2007-0073568 | 7/2007 |
| KR | 10-2007-0077000 | 7/2007 |
| KR | 10-2007-0078705 | 8/2007 |
| KR | 10-2007-0091962 | 9/2007 |
| KR | 10-2008-0079059 | 8/2008 |
| WO | 00-44145 | 7/2000 |
| WO | 00-45552 | 8/2000 |
| WO | 2004107619 | 12/2004 |
| WO | 2005045603 | 5/2005 |
| WO | 2006/028337 | 3/2006 |
| WO | 2006-001635 | 4/2006 |
| WO | 2006037925 | 4/2006 |
| WO | 2006/065071 | 6/2006 |
| WO | 2007021157 | 2/2007 |
| WO | 2007/068294 | 6/2007 |

OTHER PUBLICATIONS

Digital Video Broadcasting (DVB) Document A092 Rev. 2, DVB-H Implementation Guidelines, May 2007,111 pages.

M. R. Chari et al., "FLO Physical Layer: An Overview," IEEE Transactions on Broadcasting, vol. 53, No. 1, Mar. 2007, 16 pages.

* cited by examiner

FIG. 15

| Syntax | # of bits |
| --- | --- |
| FIC_Segment () { | |
|    FIC_type | 2 |
|    Reserved | 5 |
|    error_indicator | 1 |
|    FIC_seg_number | 4 |
|    FIC_last_seg_number | 4 |
|    for (i=0:i<N:i++) { | |
|      data_byte | 8 |
|    } | |
| } | |

FIG. 16

| | Syntax | # of bits |
| --- | --- | --- |
| A first region | if (FIC_seg_number == 0) { | |
| |   current_next_indicator | 1 |
| |   Reserved | 2 |
| |   ESG_version | 5 |
| |   transport_stream_id | 16 |
| | } | |
| A second region | while ( ensemble_id != 0xFF ) | |
| |   ensemble_id | 8 |
| |   reserved | 3 |
| |   SI_version | 5 |
| |   num_channel | 3 |
| A third region |   for (i=0:i< num_channel:i++) { | |
| |     channel_type | 5 |
| |     channel_activity | 2 |
| |     CA_indicator | 1 |
| |     Stand_alone_Semce_indtcator | |
| |     major_channel_num | 8 |
| |     minor_channel_num | 8 |
| |   } | |
| | } // end of while | |
| | } | |

FIG. 17

| Syntax | No. of Bits | Format |
|---|---|---|
| service_map_table_section() { | | |
|     table_id | 8 | TBD |
|     section_syntax_indicator | 1 | '0' |
|     private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     SMT_protocol_version | 8 | uimsbf |
|     ensemble_id | 8 | uimsbf |
|     num_channels | 8 | uimsbf |
|     for (i=0; i<num_channels; i++) | | |
|     { | | |
|         major_channel_number | 8 | uimsbf |
|         minor_channel_number | 8 | uimsbf |
|         short_channel_name | 8*8 | |
|         service_id | 16 | uimsbf |
|         service_type | 6 | uimsbf |
|         virtual_channel_activity | 2 | uimsbf |
|         num_components | 5 | uimsbf |
|         IP_version_flag | 1 | bslbf |
|         source_IP_address_flag | 1 | bslbf |
|         virtual_channel_target_IP_address_flag | 1 | bslbf |
|         if (source_IP_address_flag) | | |
|             source_IP_address | 32 or 128 | uimsbf |
|         if (virtual_channel_target_IP_address_flag) | | |
|             virtual_channel_target_IP_address | 32 or 128 | uimsbf |
|         for (j=0; j<num_components; j++) | | |
|         { | | |
|             RTP_payload_type | 7 | uimsbf |
|             component_target_IP_address_flag | 1 | bslbf |
|             if (component_target_IP_address_flag) | | |
|                 component_target_IP_address | 32 or 128 | uimsbf |
|             reserved | 2 | '11' |
|             port_num_count | 6 | uimsbf |
|             target_UDP_port_num | 16 | uimsbf |
|             descriptors_length | 8 | uimsbf |
|             for (k=0; k<descriptors_length; k++) | | |
|             { | | |
|                 component_level_descriptor() | | |
|             } | | |
|         } | | |
|         descriptors_length | 8 | uimsbf |
|         for (m=0; m<descriptors_length; m++) | | |
|         { | | |
|             virtual_channel_level_descriptor() | | |
|         } | | |
|     } | | |
|     descriptors_length | 8 | uimsbf |
|     for (n=0; n<descriptors_length; n++) { | | |
|     { | | |
|         ensemble_level_descriptor() | | |
|     } ensemble_level_descriptor() | | |
| } | | |

FIG. 18

| Syntax | No. of Bits | Format |
|---|---|---|
| MH_audio_descriptor() {  <br>    descriptor_tag  <br>    descriptor_length  <br>    channel_configuration  <br>    reserved  <br>    sample_rate_code  <br>    reserved  <br>    bit_rate_code  <br>    ISO_639_language_code  <br>} | <br>8  <br>8  <br>8  <br>5  <br>3  <br>2  <br>6  <br>3*8 | <br>TBD  <br>uimsbf  <br>uimsbf  <br>'11111'  <br>uimsbf  <br>'11'  <br>uimsbf  <br>uimsbf |

FIG. 19

| Syntax | No. of Bits | Format |
|---|---|---|
| MH_RTP_payload_type_descriptor() {  <br>    descriptor_tag  <br>    descriptor_length  <br>    reserved  <br>    RTP_payload_type  <br>    MIME_type_length  <br>    MIME_type()  <br>} | <br>8  <br>8  <br>1  <br>7  <br>8  <br>var | <br>TBD  <br>uimsbf  <br>'1'  <br>uimsbf  <br>uimsbf |

FIG. 20

| Syntax | No. of Bits | Format |
|---|---|---|
| MH_current_event_descriptor() {  <br>    descriptor_tag  <br>    descriptor_length  <br>    event_id  <br>    current_event_start_time  <br>    current_event_duration  <br>    Title_length  <br>    Title_text()  <br>} | <br>8  <br>8  <br>16  <br>4*8  <br>3*8  <br>8  <br>var | <br>TBD  <br>uimsbf  <br>uimsbf  <br>uimsbf  <br>uimsbf  <br>uimsbf |

FIG. 21

| Syntax | No. of Bits | Format |
|---|---|---|
| MH_next_event_descriptor() {  |  |  |
|     descriptor_tag | 8 | TBD |
|     descriptor_length | 8 | uimsbf |
|     event_id | 16 | uimsbf |
|     next_event_start_time | 4*8 | uimsbf |
|     next_event_duration | 3*8 | uimsbf |
|     title_length | 8 | uimsbf |
|     title_text() | var |  |
| } |  |  |

FIG. 22

| Syntax | No. of Bits | Format |
|---|---|---|
| MH_system_time_descriptor() { |  |  |
|     descriptor_tag | 8 | TBD |
|     descriptor_length | 8 | uimsbf |
|     system_time | 32 | uimsbf |
|     GPS_UTC_offset | 8 | uimsbf |
|     time_zone_offset_polarity_rate_code | 1 | bslbf |
|     time_zone_offset | 31 | uimsbf |
|     daylight_savings() | 16 | uimsbf |
|     time_zone() | 5*8 |  |
| } |  |  |

FIG. 35

| Syntax | No. of Bits | Format |
|---|---|---|
| service_map_table_section() { | | |
|    table_id | 8 | TBD |
|    section_syntax_indicator | 1 | '0' |
|    private_indicator | 1 | '1' |
|    reserved | 2 | '11' |
|    section_length | 12 | uimsbf |
|    reserved | 3 | '111' |
|    version_number | 5 | uimsbf |
|    section_number | 8 | uimsbf |
|    last_section_number | 8 | uimsbf |
|    ensemble_id | 8 | uimsbf |
|    for (i=0; i<NumChannels ; i++) | | |
|    { | | |
|      major_channel_number | 8 | uimsbf |
|      minor_channel_number | 8 | uimsbf |
|      service_id | 16 | uimsbf |
|      first_MH_TP_num | 8 | uimsbf |
|      last_MH_TP_num | 8 | uimsbf |
|      descriptors_length | 8 | uimsbf |
|      for (i=0; i<N; i++) { | | |
|        descriptor() | | |
|      } | | |
|    } | | |
|    additional_descriptors_length | 8 | uimsbf |
|    for (j=0; j<N; j++) { | | |
|      additional_descriptor() | | |
|    } | | |
| } | | |

DIGITAL BROADCASTING RECEIVER AND METHOD FOR CONTROLLING THE SAME

CROSS-REFERENCE TO RELATED APPLICATIONS

This application is a continuation of U.S. application Ser. No. 14/496,871, filed on Sep. 25, 2014, now U.S. Pat. No. 9,241,175, which is a continuation of U.S. application Ser. No. 14/069,202, filed on Oct. 31, 2013, now U.S. Pat. No. 8,880,984, which is a continuation of U.S. application Ser. No. 12/699,022, filed on Feb. 2, 2010, now U.S. Pat. No. 8,589,772, which is a continuation of U.S. application Ser. No. 12/235,572, filed on Sep. 22, 2008, now U.S. Pat. No. 7,813,310, which claims the benefit of U.S. Provisional Application Nos. 60/974,084, filed on Sep. 21, 2007, 60/977,379, filed on Oct. 4, 2007, 60/980,165, filed on Oct. 15, 2007, 61/044,504, filed on Apr. 13, 2008, and 61/076,686, filed on Jun. 29, 2008, and also claims the benefit of earlier filing date and right of priority to Korean Application No. 10-2008-0092446, filed on Sep. 19, 2008, the contents of which are all hereby incorporated by reference herein in their entireties.

BACKGROUND OF THE INVENTION

1. Field of the Invention

The present invention relates to a digital broadcasting receiver and a method for controlling the same, and more particularly, to a digital broadcasting system and a data processing method.

2. Discussion of the Related Art

The Vestigial. Sideband (VSB) transmission mode, which is adopted as the standard for digital broadcasting in North America and the Republic of Korea, is a system using a single carrier method. Therefore, the receiving performance of the digital broadcast receiving system may be deteriorated in a poor channel environment. Particularly, since resistance to changes in channels and noise is more highly required when using portable and/or mobile broadcast receivers, the receiving performance may be even more deteriorated when transmitting mobile service data by the VSB transmission mode.

SUMMARY OF THE INVENTION

Accordingly, the present invention is directed to a digital broadcasting receiver and a method for controlling the same that substantially obviate one or more problems due to limitations and disadvantages of the related art.

Another object of the present invention is to provide a method for processing services having various formats in a mobile digital broadcasting environment.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for processing data in a reception system, the method includes receiving a broadcasting signal including mobile service data and main service data, the mobile service data including first service data and second service data having a format different from that of the first service data, the second service data configuring a Reed Solomon (RS) frame, and the RS frame including a table which describes the second service data and signaling information of the second service data, parsing the table from the RS frame and extracting the signaling information of the second service data, and parsing the second service data from the RS frame on the basis of the extracted signaling information.

At this time, at least one data group configuring the RS frame may include a plurality of known data sequences, a signaling information zone may be included between a first known data sequence and a second known data sequence of the known data sequences, and the signaling information zone may include transmission parameter channel (TPC) signaling and fast information channel (FIC) signaling.

The RS frame may be configured by an RS frame header and an RS frame payload, and the RS frame payload may include a transport packet configured by packetizing at least one piece of data, for a second service.

The RS frame header may include at least one of first information for identifying the type of data in the transport packet transmitted via the payload, second information indicating whether or not an error is included in the transport packet transmitted via the payload, third information indicating whether or not stuffing bytes are included in the RS frame, and fourth information indicating a start point of new data in the transport packet transmitted via the payload.

The first information may identify the type of the data in the transmitted transport packet, and the type may be identified by data for a first service and data for the second service.

The transport packet transmitted via the RS payload may include a flow packet including the data for the second service.

The flow packet may be configured by a flow packet header and a flow packet payload, and the flow packet payload may include a layer packet packetized in at least one layer for the second service and length information indicating the length of the layer packet.

The flow packet header may include at least one of an identifier for identifying the layer packet included in the flow packet, information indicating whether the flow packet is transmitted over at least one RS frame, information indicating whether cyclic redundancy check (CRC) is applied to the flow packet, and information indicating the number of layer packets included in the flow packet.

In another aspect of the present invention, there is provided a reception system includes a baseband processor receiving a broadcasting signal including mobile service data and main service data, the mobile service data including first service data and second service data having a format different from that of the first service data, the second service data configuring a Reed Solomon (RS) frame, and the RS frame including a table which describes the second service data and signaling information of the second service data, a table handler parsing the table from the RS frame and extracting the signaling information of the second service data, and service handlers parsing the second service data from the RS frame on the basis of the extracted signaling information of the second service data.

At this time, at least one data group configuring the RS frame may include a plurality of known data sequences, a signaling information zone may be included between a first known data sequence and a second known data sequence of the known data sequences, and the signaling information zone may include transmission parameter channel (TPC) signaling and fast information channel (FIC) signaling.

The baseband processor may further include a known data detector detecting the known data sequences included in the data group, and the detected known data sequences are used for demodulation and channel equalization of the mobile service data.

The table handler may extract the table including the signaling information of the second service data from the RS frame configured by an RS frame header and an RS frame payload, and the RS frame payload may include a transport packet configured by packetizing at least one piece of data, for a second service.

The table handler may extract and use the RS frame header including at least one of first information for identifying the type of data in the transport packet transmitted via the payload, second information indicating whether or not an error is included in the transport packet transmitted via the payload, third information indicating whether or not stuffing bytes are included in the RS frame, and fourth information indicating a start point of new data in the transport packet transmitted via the payload, and one of the service handlers may be selected by identifying whether the type of the data in the transmitted transported packet include the first service data or the second service data from the extracted first information.

The selected service handler may process the transport packet transmitted via the RS frame payload, the transport packet may include a flow packet including data for the second service, and the flow packet may include a flow packet header and a flow packet payload including a layer packet packetized in at least one layer for the second service and length information indicating the length of the layer packet.

The service handlers may process the flow packet header including at least one of an identifier for identifying the layer packet included in the flow packet, information indicating whether the flow packet is transmitted over at least one RS frame, information indicating whether cyclic redundancy check (CRC) is applied to the flow packet, and information indicating the number of layer packets included in the flow packet.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment (s) of the invention and together with the description serve to explain the principle of the invention. In the drawings:

FIG. 15 illustrates an exemplary bit stream syntax structure with respect to an FIC segment according to an embodiment of the present invention;

FIG. 16 illustrates an exemplary bit stream syntax structure with respect to a payload of an FIC segment according to the present invention, when an FIC type field value is equal to '0';

FIG. 17 illustrates an exemplary bit stream syntax structure of a service map table according to the present invention;

FIG. 18 illustrates an exemplary bit stream syntax structure of an MH audio descriptor according to the present invention;

FIG. 19 illustrates an exemplary bit stream syntax structure of an MH RTP payload type descriptor according to the present invention;

FIG. 20 illustrates an exemplary bit stream syntax structure of an MH current event descriptor according to the present invention;

FIG. 21 illustrates an exemplary bit stream syntax structure of an MH next event descriptor according to the present invention;

FIG. 22 illustrates an exemplary bit stream syntax structure of an MH system time descriptor according to the present invention;

FIG. 35 is a view showing the syntax of the bitstream of a service map table according to another embodiment of the present invention.

DETAILED DESCRIPTION OF THE INVENTION

Figure 1:
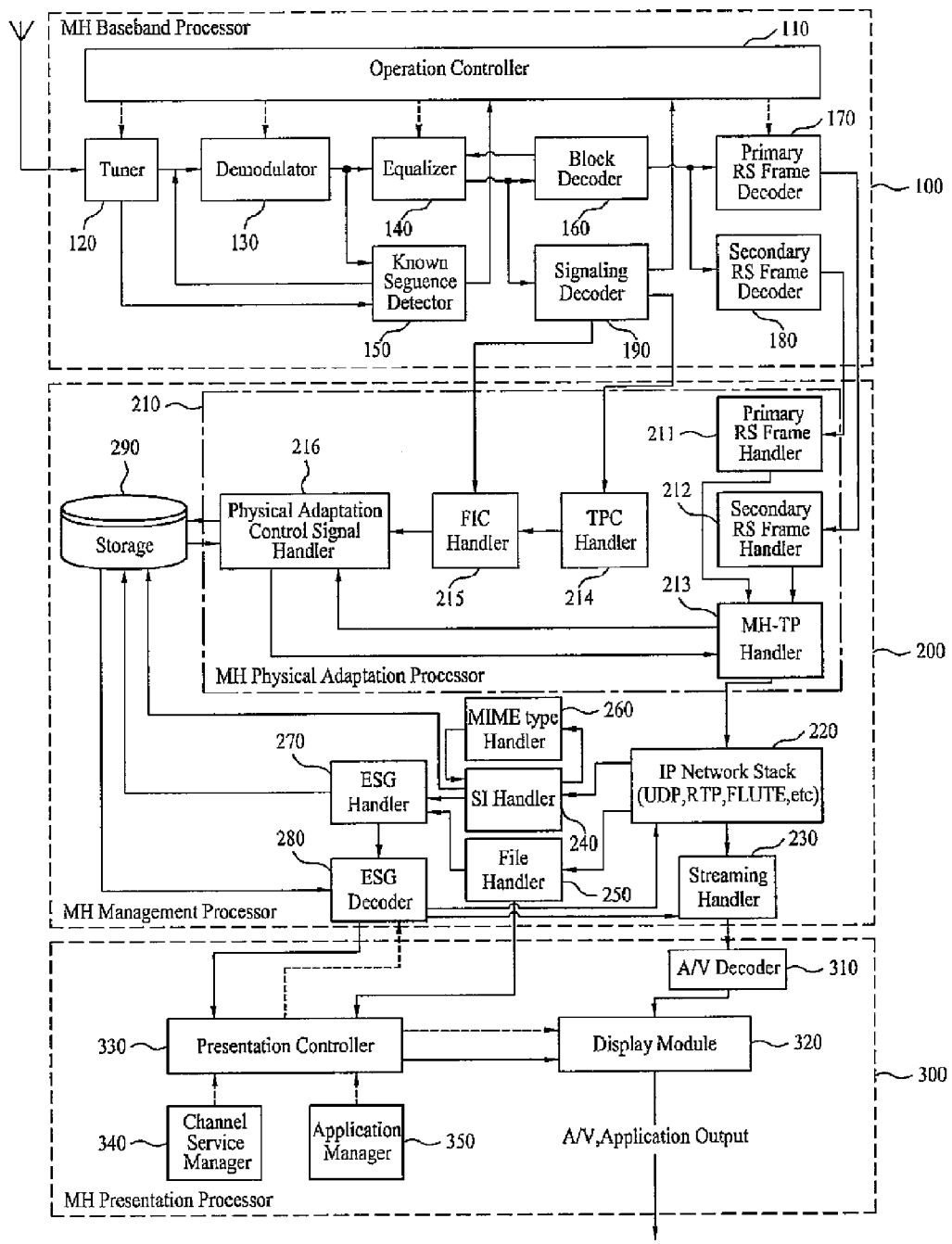
FIG. 1 illustrates a block diagram showing a general structure of a digital broadcasting receiving system according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Among the terms used in the description of the present invention, main service data correspond to data that can be received by a fixed receiving system and may include audio/video (A/V) data. More specifically, the main service data may include A/V data of high definition (HD) or standard definition (SD) levels and may also include diverse data types required for data broadcasting. Also, the known data correspond to data pre-known in accordance with a pre-arranged agreement between the receiving system and the transmitting system. Additionally, among the terms used in the present invention, "MH" corresponds to the initials of "mobile" and "handheld" and represents the opposite concept of a fixed-type system. Furthermore, the MH service data may include at least one of mobile service data and handheld service data, and will also be referred to as "mobile service data" for simplicity. Herein, the mobile service data not only correspond to MH service data but may also include any type of service data with mobile or portable characteristics. Therefore, the mobile service data according to the present invention are not limited only to the MH service data.

The above-described mobile service data may correspond to data having information, such as program execution files, stock information, and so on, and may also correspond to A/V data. Most particularly, the mobile service data may correspond to A/V data having lower resolution and lower data rate as compared to the main service data. For example, if an A/V codec that is used for a conventional main service corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information may be transmitted as the main service data.

Also, a data service using the mobile service data may include weather forecast services, traffic information services, stock information services, viewer participation quiz programs, real-time polls and surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above. In the present invention, the transmitting system provides backward compatibility in the main service data so as to be received by the conventional receiving system. Herein, the main service data and the mobile service data are multiplexed to the same physical channel and then transmitted.

Furthermore, the digital broadcast transmitting system according to the present invention performs additional encoding on the mobile service data and inserts the data already known by the receiving system and transmitting system (e.g., known data), thereby transmitting the processed data. Therefore, when using the transmitting system according to the present invention, the receiving system may receive the mobile service data during a mobile state and may also receive the mobile service data with stability despite various distortion and noise occurring within the channel.

Receiving System

FIG. 1 illustrates a block diagram showing a general structure of a digital broadcasting receiving system according to an embodiment of the present invention. The digital broadcast receiving system according to the present invention includes a baseband processor 100, a management processor 200, and a presentation processor 300. The baseband processor 100 includes an operation controller 110, a tuner 120, a demodulator 130, an equalizer 140, a known sequence detector (or known data detector) 150, a block decoder (or mobile handheld block decoder) 160, a promary Reed-Solomon (RS) frame decoder 170, a secondary RS frame decoder 180, and a signaling decoder 190. The operation controller 110 controls the operation of each block included in the baseband processor 100.

By tuning the receiving system to a specific physical channel frequency, the tuner 120 enables the receiving system to receive main service data, which correspond to broadcast signals for fixed-type broadcast receiving systems, and mobile service data, which correspond to broadcast signals for mobile broadcast receiving systems. At this point, the tuned frequency of the specific physical channel is down-converted to an intermediate frequency (IF) signal, thereby being outputted to the demodulator 130 and the known sequence detector 140. The passband digital IF signal being outputted from the tuner 120 may only include main service data, or only include mobile service data, or include both main service data and mobile service data.

The demodulator 130 performs self-gain control, carrier wave recovery, and timing recovery processes on the passband digital IF signal inputted from the tuner 120, thereby modifying the IF signal to a baseband signal. Then, the demodulator 130 outputs the baseband signal to the equalizer 140 and the known sequence detector 150. The demodulator 130 uses the known data symbol sequence inputted from the known sequence detector 150 during the timing and/or carrier wave recovery, thereby enhancing the demodulating performance. The equalizer 140 compensates channel-associated distortion included in the signal demodulated by the demodulator 130. Then, the equalizer 140 outputs the distortion-compensated signal to the block decoder 160. By using a known data symbol sequence inputted from the known sequence detector 150, the equalizer 140 may enhance the equalizing performance. Furthermore, the equalizer 140 may receive feed-back on the decoding result from the block decoder 160, thereby enhancing the equalizing performance.

The known sequence detector 150 detects known data place (or position) inserted by the transmitting system from the input/output data (i.e., data prior to being demodulated or data being processed with partial demodulation). Then, the known sequence detector 150 outputs the detected known data position information and known data sequence generated from the detected position information to the demodulator 130 and the equalizer 140. Additionally, in order to allow the block decoder 160 to identify the mobile service data that have been processed with additional encoding by the transmitting system and the main service data that have not been processed with any additional encoding, the known sequence detector 150 outputs such corresponding information to the block decoder 160.

If the data channel-equalized by the equalizer 140 and inputted to the block decoder 160 correspond to data processed with both block-encoding and trellis-encoding by the transmitting system (i.e., data within the RS frame, signaling data), the block decoder 160 may perform trellis-decoding and block-decoding as inverse processes of the transmitting system. On the other hand, if the data channel-equalized by the equalizer 140 and inputted to the block decoder 160 correspond to data processed only with trellis-encoding and not block-encoding by the transmitting system (i.e., main service data), the block decoder 160 may perform only trellis-decoding.

The signaling decoder 190 decoded signaling data that have been channel-equalized and inputted from the equalizer 140. It is assumed that the signaling data inputted to the signaling decoder 190 correspond to data processed with both block-encoding and trellis-encoding by the transmitting system. Examples of such signaling data may include transmission parameter channel (TPC) data and fast information channel (FIC) data. Each type of data will be described in more detail in a later process. The FIC data decoded by the signaling decoder 190 are outputted to the FIC handler 215. And, the TPC data decoded by the signaling decoder 190 are outputted to the TPC handler 214.

Meanwhile, according to the present invention, the transmitting system uses RS frames by encoding units. Herein, the RS frame may be divided into a primary RS frame and a secondary RS frame. However, according to the embodiment of the present invention, the primary RS frame and the secondary RS frame will be divided based upon the level of importance of the corresponding data. The primary RS frame decoder 170 receives the data outputted from the block decoder 160. At this point, according to the embodiment of the present invention, the primary RS frame decoder 170 receives only the mobile service data that have been Reed-Solomon (RS)-encoded and/or cyclic redundancy check (CRC)-encoded from the block decoder 160.

Herein, the primary RS frame decoder 170 receives only the mobile service data and not the main service data. The primary RS frame decoder 170 performs inverse processes of an RS frame encoder (not shown) included in the digital broadcast transmitting system, thereby correcting errors existing within the primary RS frame. More specifically, the primary RS frame decoder 170 forms a primary RS frame by grouping a plurality of data groups and, then, correct errors in primary RS frame units. In other words, the primary RS frame decoder 170 decodes primary RS frames, which are being transmitted for actual, broadcast services.

Additionally, the secondary RS frame decoder 180 receives the data outputted from the block decoder 160. At this point, according to the embodiment of the present invention, the secondary RS frame decoder 180 receives only the mobile service data that have been RS-encoded and/or CRC-encoded from the block decoder 160. Herein, the secondary RS frame decoder 180 receives only the mobile service data and not the main service data. The secondary RS frame decoder 180 performs inverse processes of an RS frame encoder (not shown) included in the digital broadcast transmitting system, thereby correcting errors existing within the secondary RS frame. More specifically, the secondary RS frame decoder 180 forms a secondary RS frame by grouping a plurality of data groups and, then, correct errors in secondary RS frame units. In other words, the secondary RS frame decoder 180 decodes secondary RS frames, which are being transmitted for mobile audio service data, mobile video service data, guide data, and so on.

Meanwhile, the management processor 200 according to an embodiment of the present invention includes an MH physical adaptation processor 210, an IP network stack 220, a streaming handler 230, a system information (SI) handler 240, a file handler 250, a multi-purpose internet main extensions (MIME) type handler 260, and an electronic service guide (ESG) handler 270, and an ESG decoder 280, and a storage unit 290. The MH physical adaptation processor 210 includes a primary RS frame handler 211, a secondary RS frame handler 212, an MB transport packet (TP) handler 213, a TPC handler 214, an FIC handler 215, and a physical adaptation control signal handler 216. The TPC handler 214 receives and processes baseband information required by modules corresponding to the MH physical adaptation processor 210. The baseband information is inputted in the form of TPC data. Herein, the TPC handler 214 uses this information to process the FIC data, which have been sent from the baseband processor 100.

The TPC data are transmitted from the transmitting system to the receiving system via a predetermined region of a data group. The TPC data may include at least one of an MH ensemble ID, an MH sub-frame number, a total number of MH groups (TNoG), an RS frame continuity counter, a column size of RS frame (N), and an FIC version number. Herein, the MH ensemble ID indicates an identification number of each MH ensemble carried in the corresponding channel. The MH sub-frame number signifies a number identifying the MH sub-frame number in an MH frame, wherein each MH group associated with the corresponding MH ensemble is transmitted. The TNoG represents the total number of MR groups including all of the MH groups belonging to all MH parades included in an MH sub-frame. The RS frame continuity counter indicates a number that serves as a continuity counter of the RS frames carrying the corresponding MH ensemble. Herein, the value of the RS frame continuity counter shall be incremented by 1 modulo 16 for each successive RS frame. N represents the column size of an RS frame belonging to the corresponding MH ensemble. Herein, the value of N determines the size of each MH TP. Finally, the FIC version number signifies the version number of an FIC body carried on the corresponding physical channel.

As described above, diverse TPC data are inputted to the TPC handler 214 via the signaling decoder 190 shown in FIG. 1. Then, the received TPC data are processed by the TPC handler 214. The received TPC data may also be used by the FIC handler 215 in order to process the FIC data. The FIC handler 215 processes the FIC data by associating the FIC data received from the baseband processor 100 with the TPC data. The physical adaptation control signal handler 216 collects FIC data received through the FIC handler 215 and SI data received through RS frames. Then, the physical adaptation control signal handler 216 uses the collected FIC data and SI data to configure and process IP datagrams and access information of mobile broadcast services. Thereafter, the physical adaptation control signal handler 216 stores the processed IP datagrams and access information to the storage unit 290.

The primary RS frame handler 211 identifies primary RS frames received from the primary RS frame decoder 170 of the baseband processor 100 for each row unit, so as to configure an MH TP. Thereafter, the primary RS frame handler 211 outputs the configured MH TP to the MH TP handler 213. The secondary RS frame handler 212 identifies secondary RS frames received from the secondary RS frame decoder 180 of the baseband processor 100 for each row unit, so as to configure an MH TP. Thereafter, the secondary RS frame handler 212 outputs the configured MH TP to the MH TP handler 213. The MH transport packet (TP) handler 213 extracts a header from each MH TP received from the primary RS frame handler 211 and the secondary RS frame handler 212, thereby determining the data included in the corresponding MH TP. Then, when the determined data correspond to SI data (i.e., SI data that are not encapsulated to IP datagrams), the corresponding data are outputted to the physical adaptation control signal handler 216. Alternatively, when the determined data correspond to an IP datagram, the corresponding data are outputted to the IP network stack 220.

The IP network stack 220 processes broadcast data that are being transmitted in the form of IP datagrams. More specifically, the IP network stack 220 processes data that are inputted via user datagram protocol (UDP), real-time transport protocol (RTP), real-time transport control protocol (RTCP), asynchronous layered coding/layered coding transport (ALC/LCT), file delivery over unidirectional transport (FLUTE), and so on. Herein, when the processed data correspond to streaming data, the corresponding data are outputted to the streaming handler 230. And, when the processed data correspond to data in a file format, the corresponding data are outputted to the file handler 250. Finally, when the processed data correspond to SI-associated data, the corresponding data are outputted to the SI handler 240.

The SI handler 240 receives and processes SI data having the form of IP datagrams, which are inputted to the IP network stack 220. When the inputted data associated with SI correspond to MIME-type data, the inputted data are outputted to the MIME-type handler 260. The MIME-type handler 260 receives the MIME-type SI data outputted from the SI handler 240 and processes the received MIME-type SI data. The file handler 250 receives data from the IP network stack 220 in an object format in accordance with the ALC/LCT and FLUTE structures. The file handler 250 groups the received data to create a file format. Herein, when the corresponding file includes ESG, the file is outputted to the ESG handler 270. On the other hand, when the corresponding file includes data for other file-based services, the file is outputted to the presentation controller 330 of the presentation processor 300.

The ESG handler 270 processes the ESG data received from the file handler 250 and stores the processed ESG data to the storage unit 290. Alternatively, the ESG handler 270 may output the processed ESG data to the ESG decoder 280, thereby allowing the ESG data to be used by the ESG decoder 280. The storage unit 290 stores the system information (SI) received from the physical adaptation control signal handler 210 and the ESG handler 270 therein. Thereafter, the storage unit 290 transmits the stored SI data to each block.

The ESG decoder 280 either recovers the ESG data and SI data stored in the storage unit 290 or recovers the ESG data transmitted from the ESG handler 270. Then, the ESG decoder 280 outputs the recovered data to the presentation controller 330 in a format that can be outputted to the user. The streaming handler 230 receives data from the IP network stack 220, wherein the format of the received data are in accordance with RTP and/or RTCP structures. The streaming handler 230 extracts audio/video streams from the received data, which are then outputted to the audio/video (A/V) decoder 310 of the presentation processor 300. The audio/video decoder 310 then decodes each of the audio stream and video stream received from the streaming handler 230.

The display module 320 of the presentation processor 300 receives audio and video signals respectively decoded by the A/V decoder 310. Then, the display module 320 provides the received audio and video signals to the user through a speaker and/or a screen. The presentation controller 330 corresponds to a controller managing modules that output data received by the receiving system to the user. The channel service manager 340 manages an interface with the user, which enables the user to use channel-based broadcast services, such as channel map management, channel service connection, and so on. The application manager 350 manages an interface with a user using ESG display or other application services that do not correspond to channel-based services.

Data Format Structure

Figure 2:
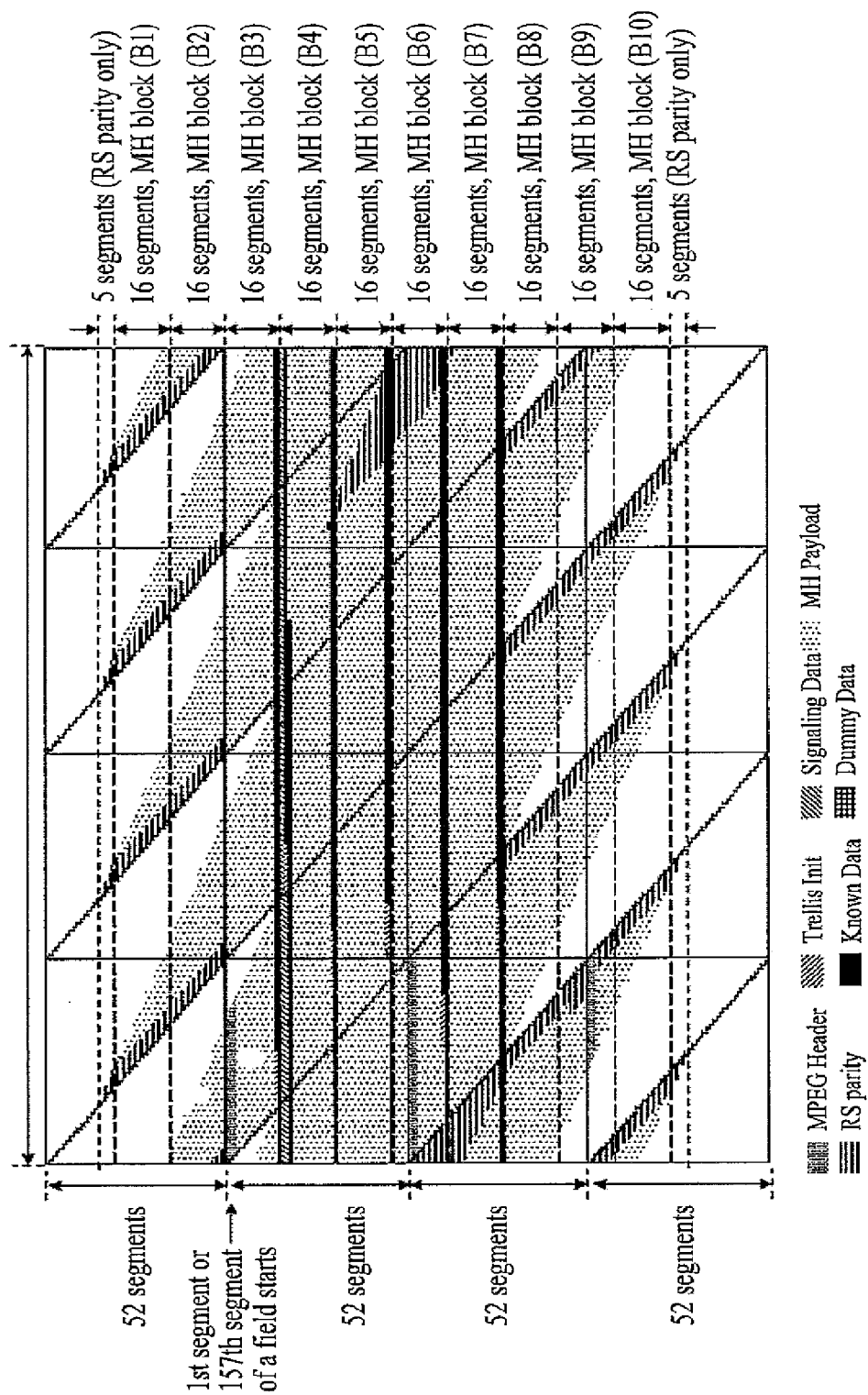
FIG. 2 illustrates an exemplary structure of a data group according to the present invention.

Meanwhile, the data structure used in the mobile broadcasting technology according to the embodiment of the present invention may include a data group structure and an RS frame structure, which will now be described in detail. FIG. 2 illustrates an exemplary structure of a data group according to the present invention. FIG. 2 shows an example of dividing a data group according to the data structure of the present invention into 10 MH blocks (i.e., MH block 1 (B1) to MH block 10 (B10)). In this example, each MH block has the length of 16 segments. Referring to FIG. 2, only the RS parity data are allocated to portions of the first 5 segments of the MH block 1 (B1) and the last 5 segments of the MH block 10 (B10). The RS parity data are excluded in regions A to D of the data group. More specifically, when it is assumed that one data group is divided into regions A, B, C, and D, each MH block may be included in any one of region A to region D depending upon the characteristic of each MH block within the data group.

Herein, the data group is divided into a plurality of regions to be used for different purposes. More specifically, a region of the main service data having no interference or a very low interference level may be considered to have a more resistant (or stronger) receiving performance as compared to regions having higher interference levels. Additionally, when using a system inserting and transmitting known data in the data group, wherein the known data are known based upon an agreement between the transmitting system and the receiving system, and when consecutively long known data are to be periodically inserted in the mobile service data, the known data having a predetermined length may be periodically inserted in the region having no interference from the main service data (i.e., a region wherein the main service data are not mixed). However, due to interference from the main service data, it is difficult to periodically insert known data and also to insert consecutively long known data to a region having interference from the main service data.

Referring to FIG. 2, MH block 4 (B4) to MH block 7 (B7) correspond to regions without interference of the main service data. MH block 4 (B4) to MH block 7 (B7) within the data group shown in FIG. 2 correspond to a region where no interference from the main service data occurs. In this example, a long known data sequence is inserted at both the beginning and end of each MH block. In the description of the present invention, the region including MH block 4 (B4) to MH block 7 (B7) will be referred to as "region A (=B4+B5+B6+B7)". As described above, when the data group includes region A having a long known data sequence inserted at both the beginning and end of each MH block, the receiving system is capable of performing equalization by using the channel information that can be obtained from the known data. Therefore, the strongest equalizing performance may be yielded (or obtained) from one of region A to region D.

In the example of the data group shown in FIG. 2, MB block 3 (B3) and MH block 8 (B8) correspond to a region having little interference from the main service data. Herein, a long known data sequence is inserted in only one side of each MH block B3 and B8. More specifically, due to the interference from the main service data, a long known data sequence is inserted at the end of MH block 3 (B3), and another long known data sequence is inserted at the beginning of MR block 8 (B8). In the present invention, the region including MH block 3 (B3) and MH block 8 (B8) will be referred to as "region B (=B3+B8)". As described above, when the data group includes region B having a long known data sequence inserted at only one side (beginning or end) of each MB block, the receiving system is capable of performing equalization by using the channel information that can be obtained from the known data. Therefore, a stronger equalizing performance as compared to region C/D may be yielded (or obtained).

Referring to FIG. 2, MH block 2 (B2) and MH block 9 (B9) correspond to a region having more interference from the main service data as compared to region B. A long known data sequence cannot be inserted in any side of MH block 2 (B2) and MH block 9 (B9). Herein, the region including MH block 2 (B2) and MH block 9 (B9) will be referred to as "region C (=B2+B9)". Finally, in the example shown in FIG. 2, MH block 1 (B1) and MH block 10 (B10) correspond to a region having more interference from the main service data as compared to region C. Similarly, a long known data sequence cannot be inserted in any side of MH block 1 (B1) and MH block 10 (B10). Herein, the region including MH block 1 (B1) and MH block 10 (B10) will be referred to as "region D (=B1+B10)". Since region C/D is spaced further apart from the known data sequence, when the channel environment undergoes frequent and abrupt changes, the receiving performance of region C/D may be deteriorated.

Additionally, the data group includes a signaling information area wherein signaling information is assigned (or allocated). In the present invention, the signaling information area may start from the $1^{st}$ segment of the $4^{th}$ MH block (B4) to a portion of the $2^{nd}$ segment. According to an embodiment of the present invention, the signaling information area for inserting signaling information may start from the $1^{st}$ segment of the $4^{th}$ MH block (B4) to a portion of the $2^{nd}$ segment. More specifically, 276 (=207+69) bytes of the $4^{th}$ MH block (B4) in each data group are assigned as the signaling information area. In other words, the signaling information area consists of 207 bytes of the $1^{st}$ segment and the first 69 bytes of the $2^{nd}$ segment of the $4^{th}$ MH block (B4). The $1^{st}$ segment of the $4^{th}$ MH block (B4) corresponds to the $17^{th}$ or $173^{rd}$ segment of a VSB field.

Herein, the signaling information may be identified by two different types of signaling channels: a transmission parameter channel (TPC) and a fast information channel (FIC). Herein, the TPC data may include at least one of an MH ensemble ID, an MH sub-frame number, a total number of MH groups (TNoG), an RS frame continuity counter, a column size of RS frame (N), and an FIC version number. However, the TPC data (or information) presented herein are merely exemplary. And, since the adding or deleting of signaling information included in the TPC data may be easily adjusted and modified by one skilled in the art, the present invention will, therefore, not be limited to the examples set forth herein. Furthermore, the FIC is provided to enable a fast service acquisition of data receivers, and the FIC includes cross layer information between the physical layer and the upper layer(s).

For example, when the data group includes 6 known data sequences, as shown in FIG. 2, the signaling information area is located between the first known data sequence and the second known data sequence. More specifically, the first known data sequence is inserted in the last 2 segments of the $3^{rd}$ MH block (B3), and the second known data sequence in inserted in the $2^{nd}$ and $3^{rd}$ segments of the $4^{th}$ MH block (B4). Furthermore, the $3^{rd}$ to $6^{th}$ known data sequences are respectively inserted in the last 2 segments of each of the $4^{th}$, $5^{th}$, $6^{th}$, and $7^{th}$ MH blocks (B4, B5, B6, and B7). The $1^{st}$ and $3^{rd}$ to $6^{th}$ known data sequences are spaced apart by 16 segments.

Hereinafter, transmission/reception of service data having a format different from the existing MH format in an MH system according to another embodiment of the present invention will be described. At this time, the service having the different format includes a MediaFLO service for providing a mobile broadcasting service of a subscription base via a single physical channel. Hereinafter, for convenience of description, for example, the MediaFLO service will be described, but the present invention is not limited thereto.

Figure 3:
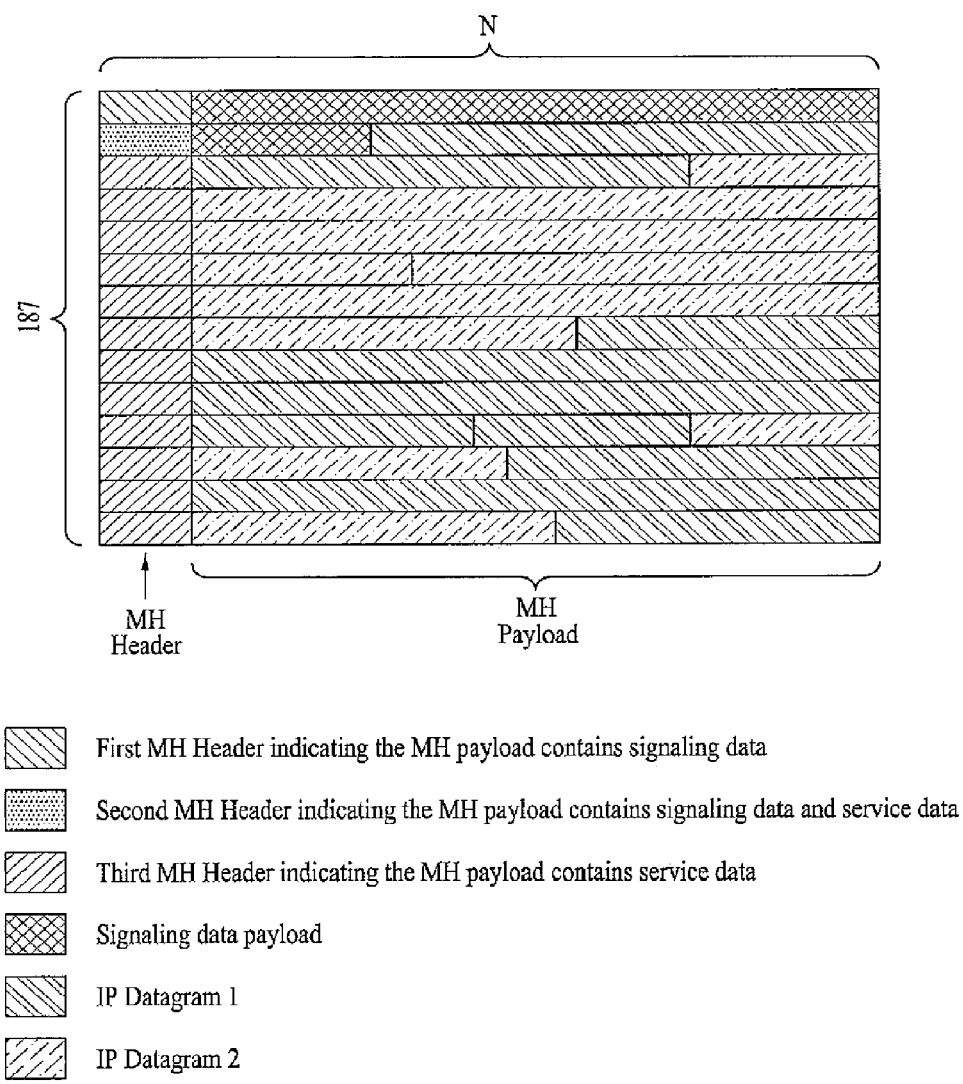
FIG. 3 illustrates an RS frame according to an embodiment of the present invention.

FIG. 3 illustrates an RS frame according to an embodiment of the present invention. The RS frame shown in FIG. 3 corresponds to a collection of one or more data groups. The RS frame is received for each MH frame in a condition where the receiving system receives the FIC and processes the received FIC and where the receiving system is switched to a time-slicing mode so that the receiving system can receive MH ensembles including ESG entry points. Each RS frame includes IP streams of each service or ESG, and SMT section data may exist in all RS frames. The RS frame according to the embodiment of the present invention consists of at least one MH transport packet (TP). Herein, the MH TP includes an MH header and an MH payload.

The MH payload may include mobile service data as well as signaling data. More specifically, an MH payload may include only mobile service data, or may include only signaling data, or may include both mobile service data and signaling data. According to the embodiment of the present invention, the MH header may identify (or distinguish) the data types included in the MH payload. More specifically, when the MH TP includes a first MH header, this indicates that the MH payload includes only the signaling data. Also, when the MH TP includes a second MH header, this indicates that the MH payload includes both the signaling data and the mobile service data. Finally, when MH TP includes a third MH header, this indicates that the MH payload includes only the mobile service data. In the example shown in FIG. 3, the RS frame is assigned with IP datagrams (IP datagram 1 and IP datagram 2) for two service types.

Data Transmission Structure

Figure 4:
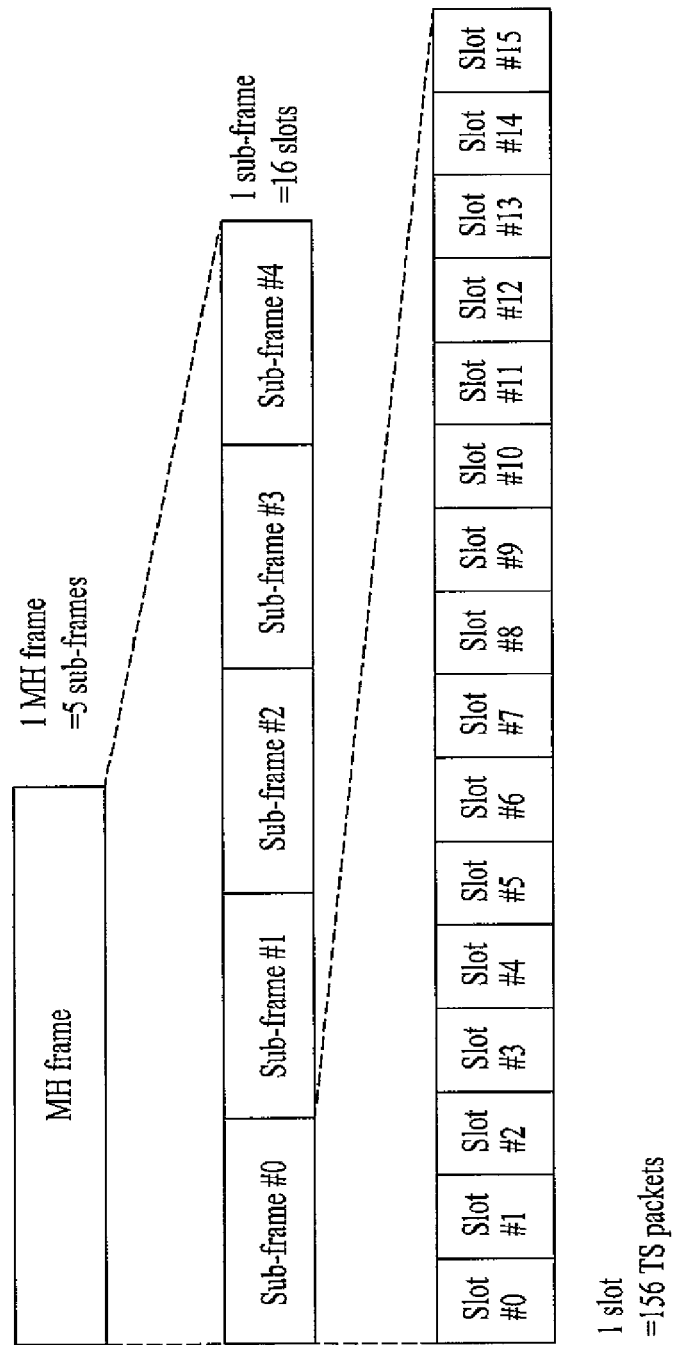
FIG. 4 illustrates an example of an MH frame structure for transmitting and receiving mobile service data according to the present invention.

FIG. 4 illustrates a structure of a MH frame for transmitting and receiving mobile service data according to the present invention. In the example shown in FIG. 4, one MH frame consists of 5 sub-frames, wherein each sub-frame includes 16 slots. In this case, the MH frame according to the present invention includes 5 sub-frames and 80 slots. Also, in a packet level, one slot is configured of 156 data packets (i.e., transport stream packets), and in a symbol level, one slot is configured of 156 data segments. Herein, the size of one slot corresponds to one half (½) of a VSB field. More specifically, since one 207-byte data packet has the same amount of data as a data segment, a data packet prior to being interleaved may also be used as a data segment. At this point, two VSB fields are grouped to form a VSB frame.

Figure 5:
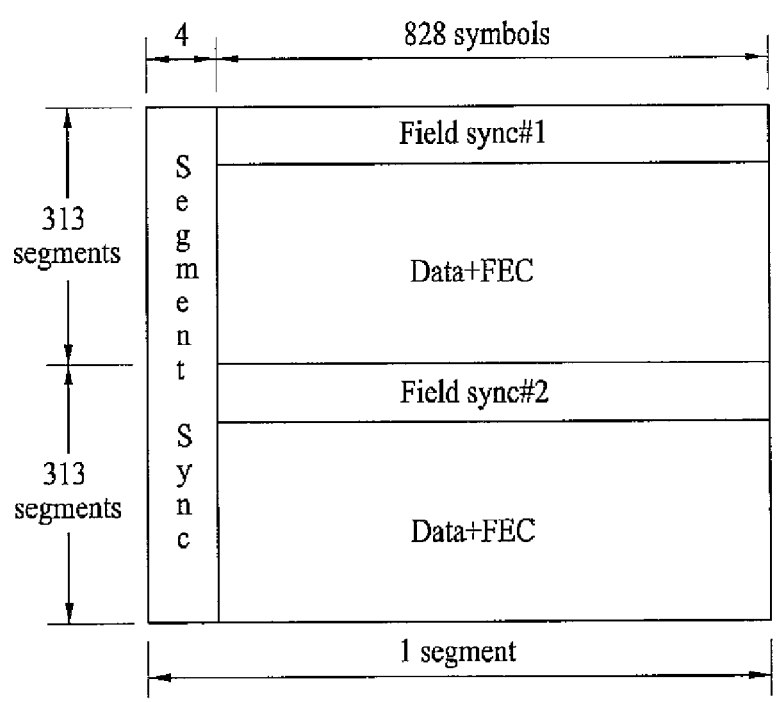
FIG. 5 illustrates an example of a general VSB frame structure.

FIG. 5 illustrates an exemplary structure of a VSB frame, wherein one VSB frame consists of 2 VSB fields (i.e., an odd field and an even field). Herein, each VSB field includes a field synchronization segment and 312 data segments. The slot corresponds to a basic time unit for multiplexing the mobile service data and the main service data. Herein, one slot may either include the mobile service data or be configured only of the main service data. If the first 118 data packets within the slot correspond to a data group, the remaining 38 data packets become the main service data packets. In another example, when no data group exists in a slot, the corresponding slot is configured of 156 main service data packets. Meanwhile, when the slots are assigned to a VSB frame, an off-set exists for each assigned position.

Figure 6:
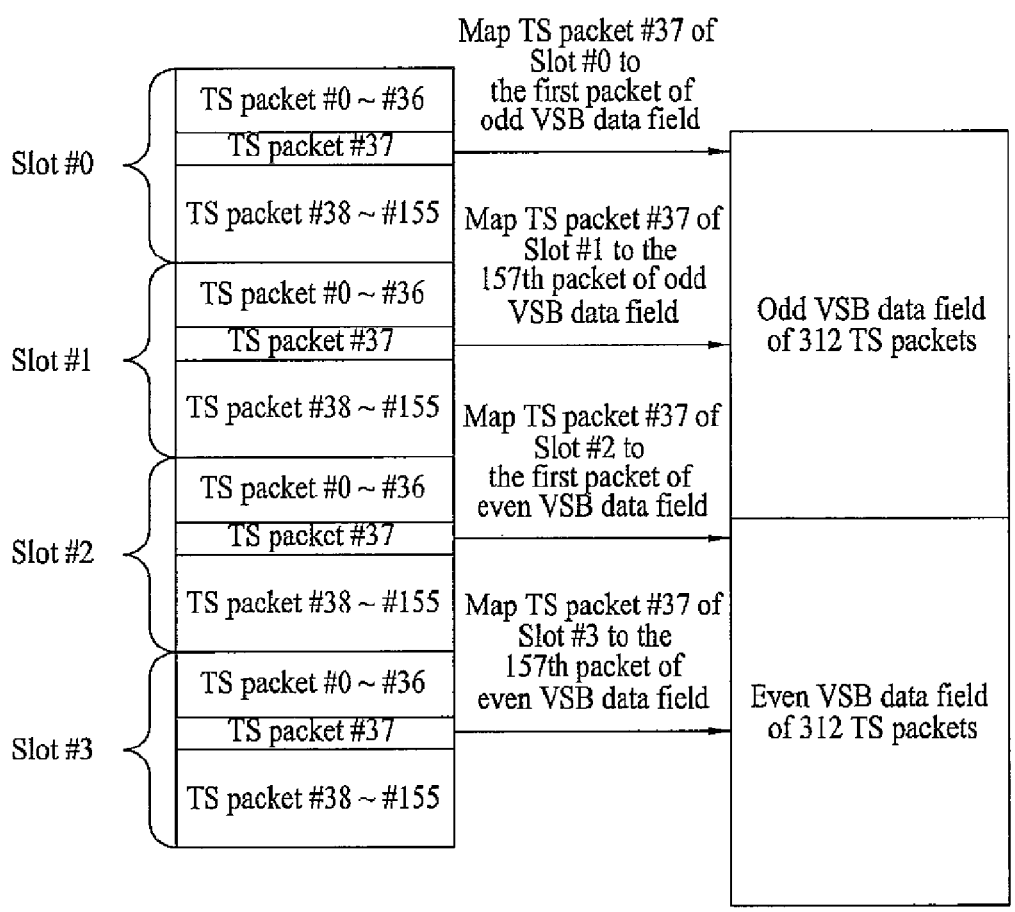
FIG. 6 illustrates a example of mapping positions of the first 4 slots of a sub-frame in a spatial area with respect to a VSB frame.
Figure 7:
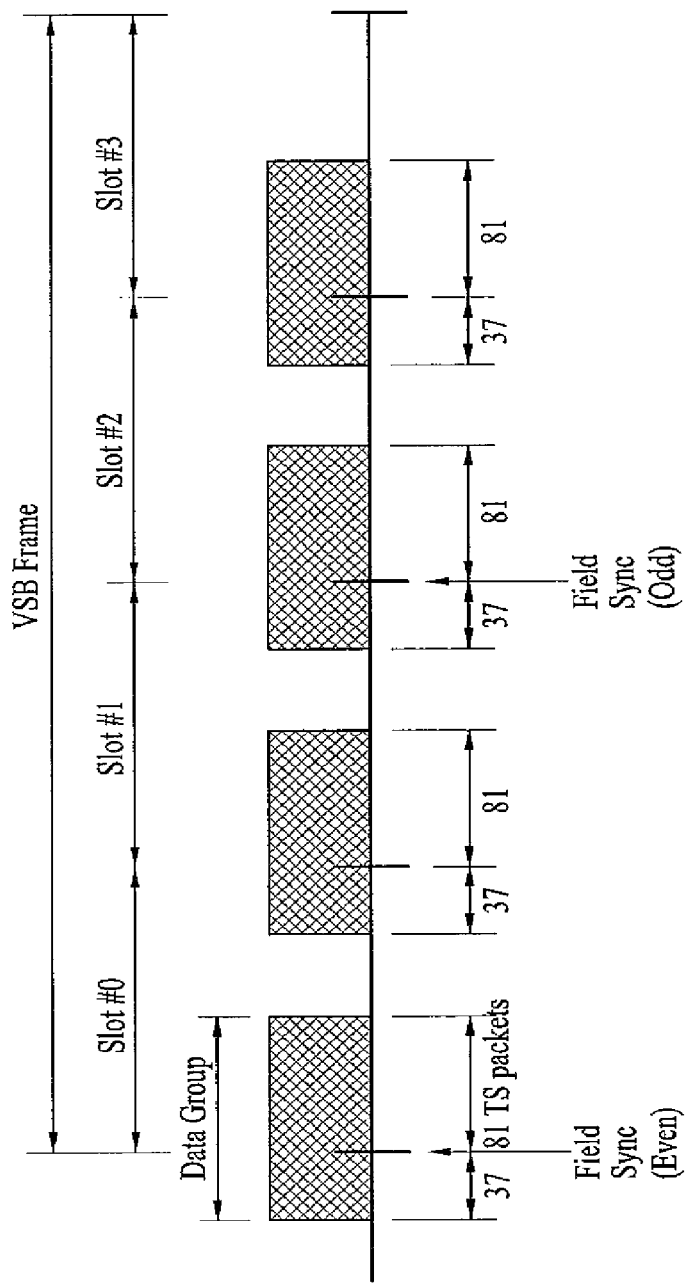
FIG. 7 illustrates a example of mapping positions of the first 4 slots of a sub-frame in a chronological (or time) area with respect to a VSB frame.

FIG. 6 illustrates a mapping example of the positions to which the first 4 slots of a sub-frame are assigned with respect to a VSB frame in a spatial area. And, FIG. 7 illustrates a mapping example of the positions to which the first 4 slots of a sub-frame are assigned with respect to a VSB frame in a chronological (or time) area. Referring to FIG. 6 and FIG. 7, a 38$^{th}$ data packet (TS packet #37) of a 1$^{st}$ slot (Slot #0) is mapped to the 1$^{st}$ data packet of an odd VSB field. A 38$^{th}$ data packet (TS packet #37) of a 2$^{nd}$ slot (Slot #1) is mapped to the 157$^{th}$ data packet of an odd VSB field. Also, a 38$^{th}$ data packet (TS packet #37) of a 3$^{rd}$ slot (Slot #2) is mapped to the 1$^{st}$ data packet of an even VSB field. And, a 38$^{th}$ data packet (TS packet #37) of a 4$^{th}$ slot (Slot #3) is mapped to the 157$^{th}$ data packet of an even VSB field. Similarly, the remaining 12 slots within the corresponding sub-frame are mapped in the subsequent VSB frames using the same method.

Figure 8:
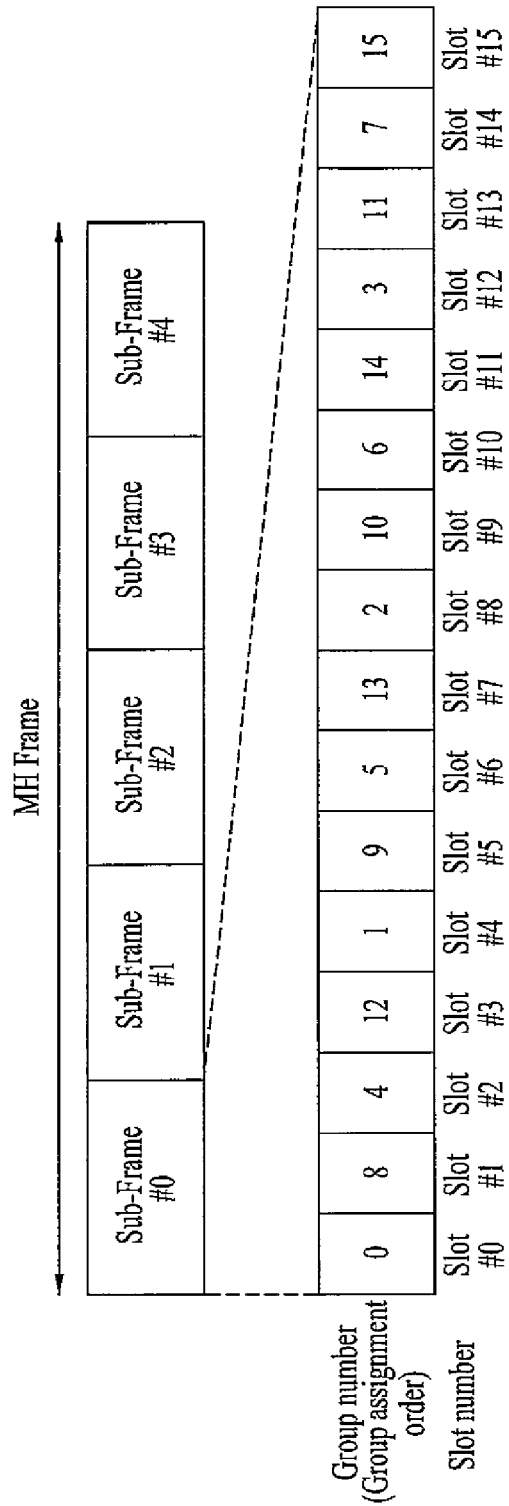
FIG. 8 illustrates an exemplary order of data groups being assigned to one of 5 sub-frames configuring an MH frame according to the present invention.

FIG. 8 illustrates an exemplary assignment order of data groups being assigned to one of 5 sub-frames, wherein the 5 sub-frames configure an MH frame. For example, the method of assigning data groups may be identically applied to all MH frames or differently applied to each MH frame. Furthermore, the method of assigning data groups may be identically applied to all sub-frames or differently applied to each sub-frame. At this point, when it is assumed that the data groups are assigned using the same method in all sub-frames of the corresponding MB frame, the total number of data groups being assigned to an MH frame is equal to a multiple of '5'. According to the embodiment of the present invention, a plurality of consecutive data groups is assigned to be spaced as far apart from one another as possible within the MH frame. Thus, the system can be capable of responding promptly and effectively to any burst error that may occur within a sub-frame.

For example, when it is assumed that 3 data groups are assigned to a sub-frame, the data groups are assigned to a 1$^{st}$ slot (Slot #0), a 5$^{th}$ slot (Slot #4), and a 9$^{th}$ slot (Slot #8) in the sub-frame, respectively. FIG. 8 illustrates an example of assigning 16 data groups in one sub-frame using the above-described pattern (or rule). In other words, each data group is serially assigned to 16 slots corresponding to the following numbers: 0, 8, 4, 12, 1, 9, 5, 13, 2, 10, 6, 14, 3, 11, 7, and 15. Equation 1 below shows the above-described rule (or pattern) for assigning data groups in a sub-frame.

$$j=(4i+O) \bmod 16 \qquad \text{Equation 1}$$

Herein,
O=0 if i<4,
O=2 else if i<8,
O=1 else if 1<12.
O=3 else.

Herein, j indicates the slot number within a sub-frame. The value of j may range from 0 to 15 (i.e., 0≤j≤15). Also, variable i indicates the data group number. The value of i may range from 0 to 15 (i.e., 0≤i≤15).

In the present invention, a collection of data groups included in a MH frame will be referred to as a "parade". Based upon the RS frame mode, the parade transmits data of at least one specific RS frame. The mobile service data within one RS frame may be assigned either to all of regions A/B/C/D within the corresponding data group, or to at least one of regions A/B/C/D. In the embodiment of the present invention, the mobile service data within one RS frame may be assigned either to all of regions A/B/C/D, or to at least one of regions A/B and regions C/D. If the mobile service data are assigned to the latter case (i.e., one of regions A/B and regions C/D), the RS frame being assigned to regions A/B and the RS frame being assigned to regions C/D within the corresponding data group are different from one another.

According to the embodiment of the present invention, the RS frame being assigned to regions A/B within the corresponding data group will be referred to as a "primary RS frame", and the RS frame being assigned to regions C/D within the corresponding data group will be referred to as a "secondary RS frame", for simplicity. Also, the primary RS frame and the secondary RS frame form (or configure) one parade. More specifically, when the mobile service data within one RS frame are assigned either to all of regions A/B/C/D within the corresponding data group, one parade transmits one RS frame. Conversely, when the mobile service data within one RS frame are assigned either to at least one of regions A/B and regions C/D, one parade may transmit up to 2 RS frames. More specifically, the RS frame mode indicates whether a parade transmits one RS frame, or whether the parade transmits two RS frames. Such RS frame mode is transmitted as the above-described TPC data. Table 1 below shows an example of the RS frame mode.

TABLE 1

| RS frame mode | Description |
| --- | --- |
| 00 | There is only one primary RS frame for all group regions |
| 01 | There are two separate RS frames. Primary RS frame for group regions A and B Secondary RS frame for group regions C and D |
| 10 | Reserved |
| 11 | Reserved |

Table 1 illustrates an example of allocating 2 bits in order to indicate the RS frame mode. For example, referring to Table 1, when the RS frame mode value is equal to '00', this indicates that one parade transmits one RS frame. And, when the RS frame mode value is equal to '01', this indicates that one parade transmits two RS frames, i.e., the primary RS frame and the secondary RS frame. More specifically, when the RS frame mode value is equal to '01', data of the primary RS frame for regions A/B are assigned and transmitted to regions A/B of the corresponding data group. Similarly, data of the secondary RS frame for regions C/D are assigned and transmitted to regions C/D of the corresponding data group.

As described in the assignment of data groups, the parades are also assigned to be spaced as far apart from one another as possible within the sub-frame. Thus, the system can be capable of responding promptly and effectively to any burst error that may occur within a sub-frame. Furthermore, the method of assigning parades may be identically applied to all MH frames or differently applied to each MH frame. According to the embodiment of the present invention, the parades may be assigned differently for each MH frame and identically for all sub-frames within an MH frame. More specifically, the MH frame structure may vary by MH frame units. Thus, an ensemble rate may be adjusted on a more frequent and flexible basis.

Figure 9:
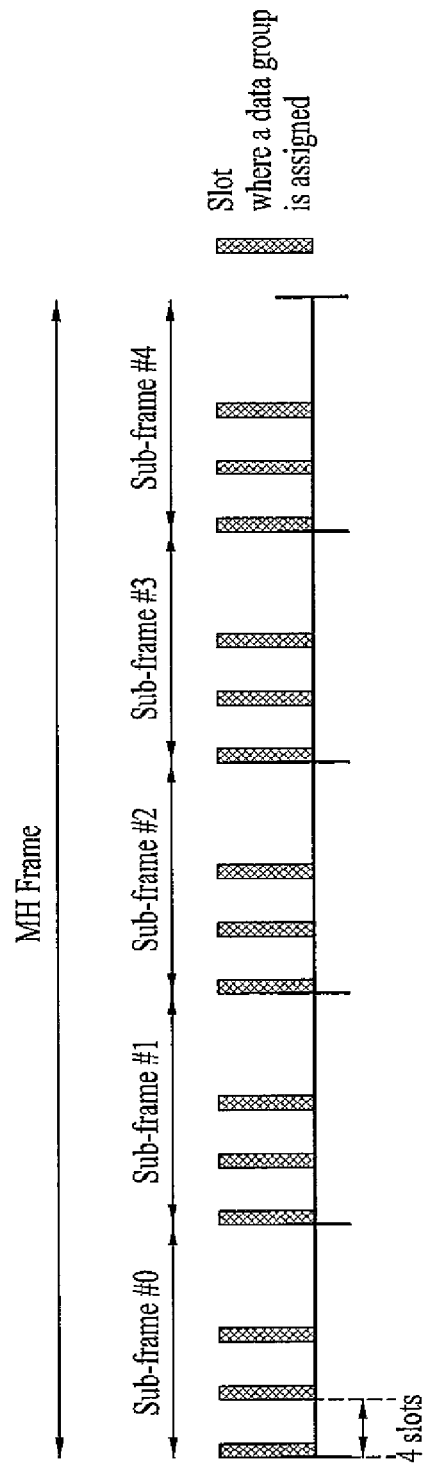
FIG. 9 illustrates an example of a single parade being assigned to an MH frame according to the present invention.

FIG. 9 illustrates an example of multiple data groups of a single parade being assigned (or allocated) to an MH frame. More specifically, FIG. 9 illustrates an example of a plurality of data groups included in a single parade, wherein the number of data groups included in a sub-frame is equal to '3', being allocated to an MH frame. Referring to FIG. 9, 3 data groups are sequentially assigned to a sub-frame at a cycle period of 4 slots. Accordingly, when this process is equally performed in the 5 sub-frames included in the corresponding MH frame, 15 data groups are assigned to a single MH frame. Herein, the 15 data groups correspond to data groups included in a parade. Therefore, since one sub-frame is configured of 4 VSB frame, and since 3 data groups are included in a sub-frame, the data group of the corresponding parade is not assigned to one of the 4 VSB frames within a sub-frame.

For example, when it is assumed that one parade transmits one RS frame, and that a RS frame encoder (not shown) included in the transmitting system performs RS-encoding on the corresponding RS frame, thereby adding 24 bytes of parity data to the corresponding RS frame and transmitting the processed RS frame, the parity data occupy approximately 11.37% ($=24/(187+24)\times 100$) of the total code word length. Meanwhile, when one sub-frame includes 3 data groups, and when the data groups included in the parade are assigned, as shown in FIG. 9, a total of 15 data groups form an RS frame. Accordingly, even when an error occurs in an entire data group due to a burst noise within a channel, the percentile is merely 6.67% ($=1/15\times 100$). Therefore, the receiving system may correct all errors by performing an erasure RS decoding process. More specifically, when the erasure RS decoding is performed, a number of channel errors corresponding to the number of RS parity bytes may be corrected. By doing so, the receiving system may correct the error of at least one data group within one parade. Thus, the minimum burst noise length correctable by a RS frame is over 1 VSB frame.

Meanwhile, when data groups of a parade are assigned as shown in FIG. 9, either main service data may be assigned between each data group, or data groups corresponding to different parades may be assigned between each data group. More specifically, data groups corresponding to multiple parades may be assigned to one MH frame. Basically, the method of assigning data groups corresponding to multiple parades is very similar to the method of assigning data groups corresponding to a single parade. In other words, data groups included in other parades that are to be assigned to an MH frame are also respectively assigned according to a cycle period of 4 slots. At this point, data groups of a different parade may be sequentially assigned to the respective slots in a circular method. Herein, the data groups are assigned to slots starting from the ones to which data groups of the previous parade have not yet been assigned. For example, when it is assumed that data groups corresponding to a parade are assigned as shown in FIG. 9, data groups corresponding to the next parade may be assigned to a sub-frame starting either from the $12^{th}$ slot of a sub-frame. However, this is merely exemplary. In another example, the data groups of the next parade may also be sequentially assigned to a different slot within a sub-frame at a cycle period of 4 slots starting from the $3^{rd}$ slot.

Figure 10:
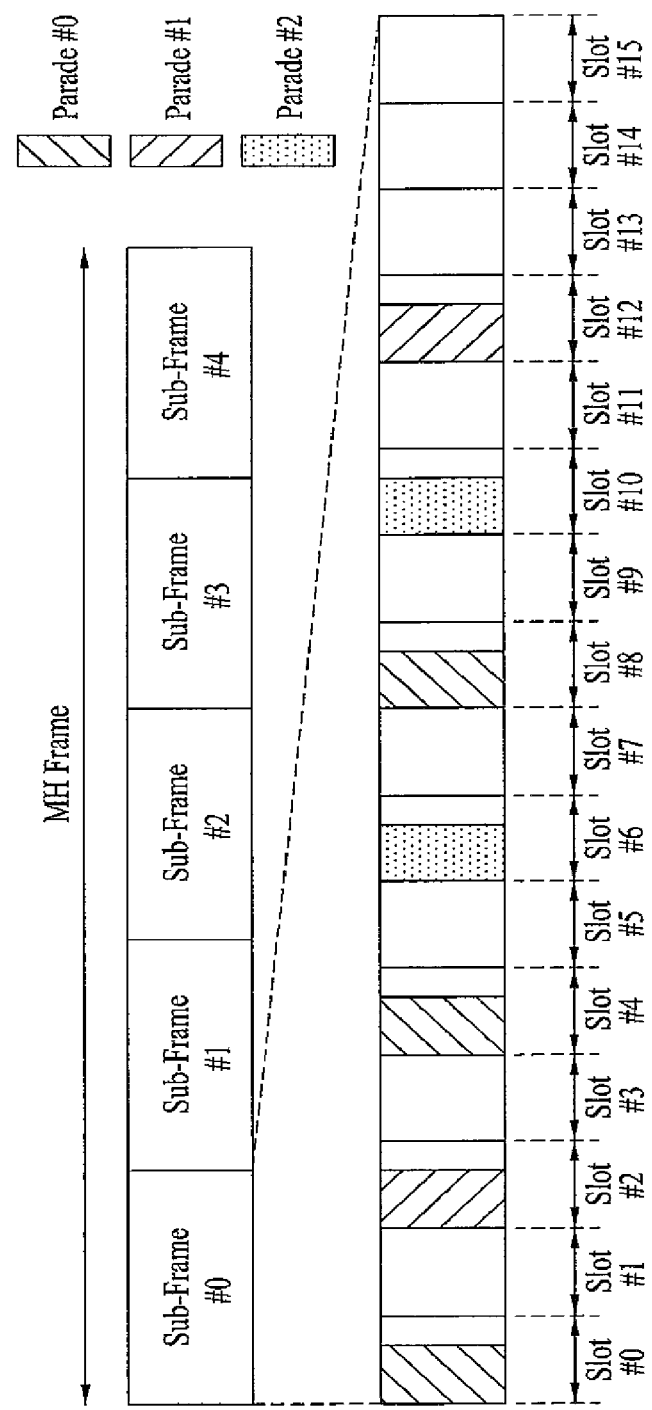
FIG. 10 illustrates an example of 3 parades being assigned to an MH frame according to the present invention.

FIG. 10 illustrates an example of transmitting 3 parades (Parade #0, Parade #1, and Parade #2) to an MH frame. More specifically, FIG. 10 illustrates an example of transmitting parades included in one of 5 sub-frames, wherein the 5 sub-frames configure one MH frame. When the $1^{st}$ parade (Parade #0) includes 3 data groups for each sub-frame, the positions of each data groups within the sub-frames may be obtained by substituting values '0' to '2' for i in Equation 1. More specifically, the data groups of the $1^{st}$ parade (Parade #0) are sequentially assigned to the $1^{st}$, $5^{th}$, and $9^{th}$ slots (Slot #0, Slot #4, and Slot #8) within the sub-frame. Also, when the $2^{nd}$ parade includes 2 data groups for each sub-frame, the positions of each data groups within the sub-frames may be obtained by substituting values '3' and '4' for i in Equation 1. More specifically, the data groups of the $2^{nd}$ parade (Parade #1) are sequentially assigned to the $2^{nd}$ and $12^{th}$ slots (Slot #3 and Slot #11) within the sub-frame. Finally, when the $3^{rd}$ parade includes 2 data groups for each sub-frame, the positions of each data groups within the sub-frames may be obtained by substituting values '5' and '6' for i in Equation 1. More specifically, the data groups of the $3^{rd}$ parade (Parade #2) are sequentially assigned to the 7$^{th}$ and 11$^{th}$ slots (Slot #6 and Slot #10) within the sub-frame.

As described above, data groups of multiple parades may be assigned to a single MH frame, and, in each sub-frame, the data groups are serially allocated to a group space having 4 slots from left to right. Therefore, a number of groups of one parade per sub-frame (NoG) may correspond to any one integer from '1' to '8'. Herein, since one MH frame includes 5 sub-frames, the total number of data groups within a parade that can be allocated to an MH frame may correspond to any one multiple of '5' ranging from '5' to '40'.

Figure 11:
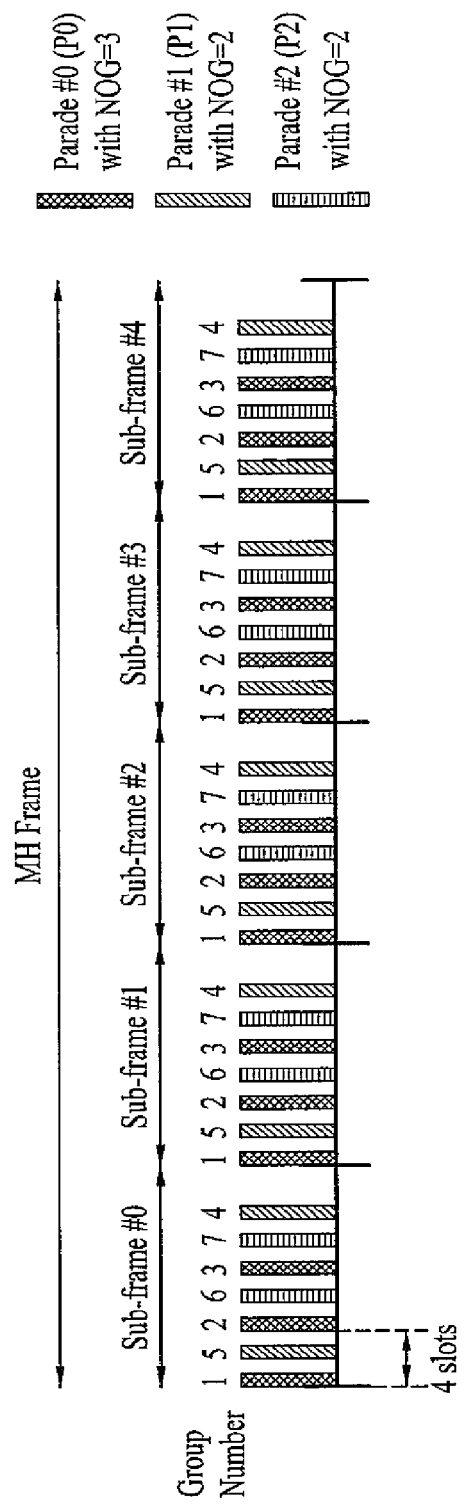
FIG. 11 illustrates an example of the process of assigning 3 parades shown in FIG. 10 being expanded to 5 sub-frames within an MH frame.
Figure 12:
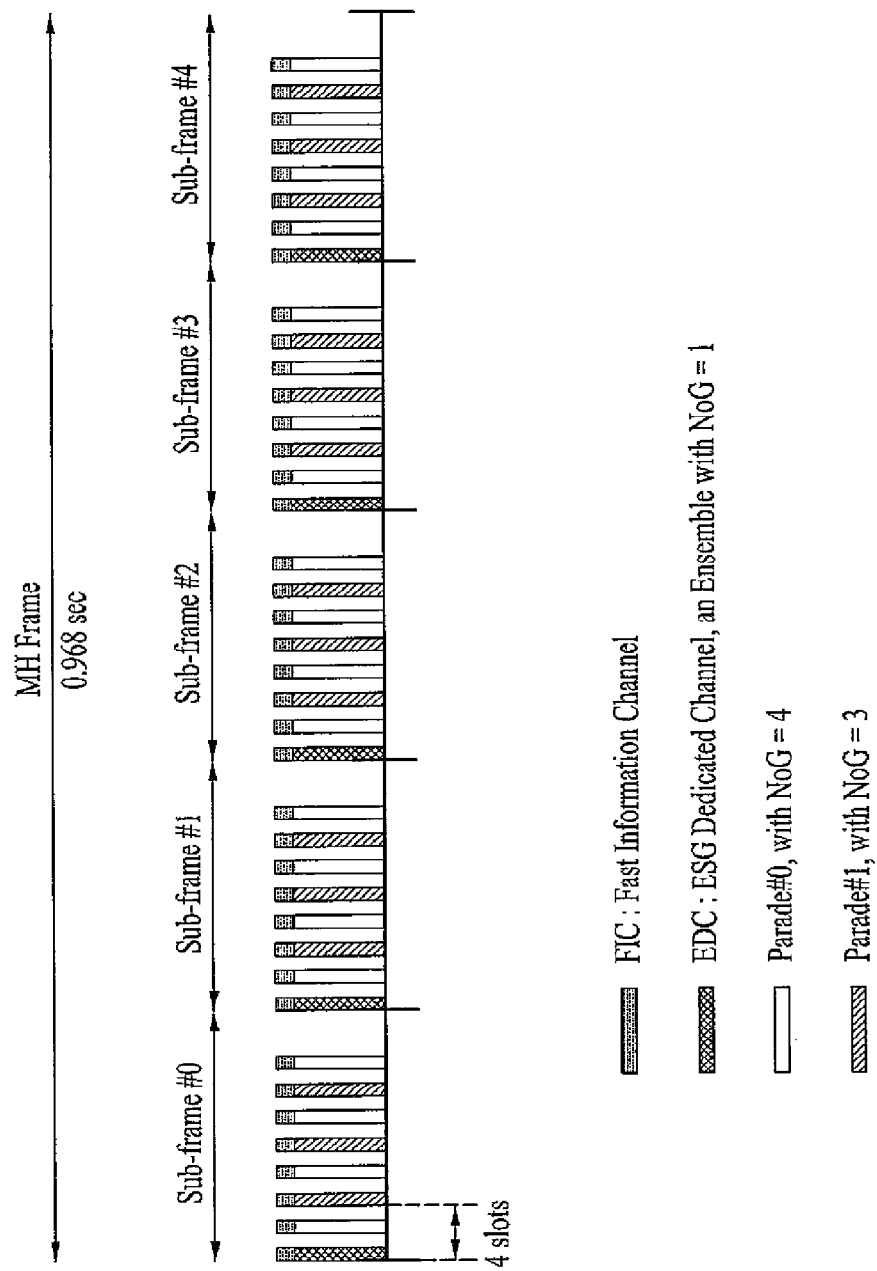
FIG. 12 illustrates a data transmission structure according to an embodiment of the present invention, wherein signaling data are included in a data group so as to be transmitted.

FIG. 11 illustrates an example of expanding the assignment process of 3 parades, shown in FIG. 10, to 5 sub-frames within an MH frame. FIG. 12 illustrates a data transmission structure according to an embodiment of the present invention, wherein signaling data are included in a data group so as to be transmitted. As described above, an MH frame is divided into 5 sub-frames. Data groups corresponding to a plurality of parades co-exist in each sub-frame. Herein, the data groups corresponding to each parade are grouped by MH frame units, thereby configuring a single parade.

The data structure shown in FIG. 12 includes 3 parades, one ESG dedicated channel (EDC) parade (i.e., parade with NoG=1), and 2 service parades (i.e., parade with NoG=4 and parade with NoG=3). Also, a predetermined portion of each data group (i.e., 37 bytes/data group) is used for delivering (or sending) FIC information associated with mobile service data, wherein the FIC information is separately encoded from the RS-encoding process. The FIC region assigned to each data group consists of one FIC segments. Herein, each segment is interleaved by MH sub-frame units, thereby configuring an FIC body, which corresponds to a completed FIC transmission structure. However, whenever required, each segment may be interleaved by MH frame units and not by MR sub-frame units, thereby being completed in MH frame units.

Meanwhile, the concept of an MH ensemble is applied in the embodiment of the present invention, thereby defining a collection (or group) of services. Each MH ensemble carries the same QoS and is coded with the same FEC code. Also, each MH ensemble has the same unique identifier (i.e., ensemble ID) and corresponds to consecutive RS frames. As shown in FIG. 12, the FIC segment corresponding to each data group described service information of an MH ensemble to which the corresponding data group belongs. When FIC segments within a sub-frame are grouped and deinterleved, all service information of a physical channel through which the corresponding FICs are transmitted may be obtained. Therefore, the receiving system may be able to acquire the channel information of the corresponding physical channel, after being processed with physical channel tuning, during a sub-frame period. Furthermore, FIG. 12 illustrates a structure further including a separate EDC parade apart from the service parade and wherein electronic service guide (ESG) data are transmitted in the 1$^{st}$ slot of each sub-frame.

Hierarchical Signaling Structure

Figure 13:
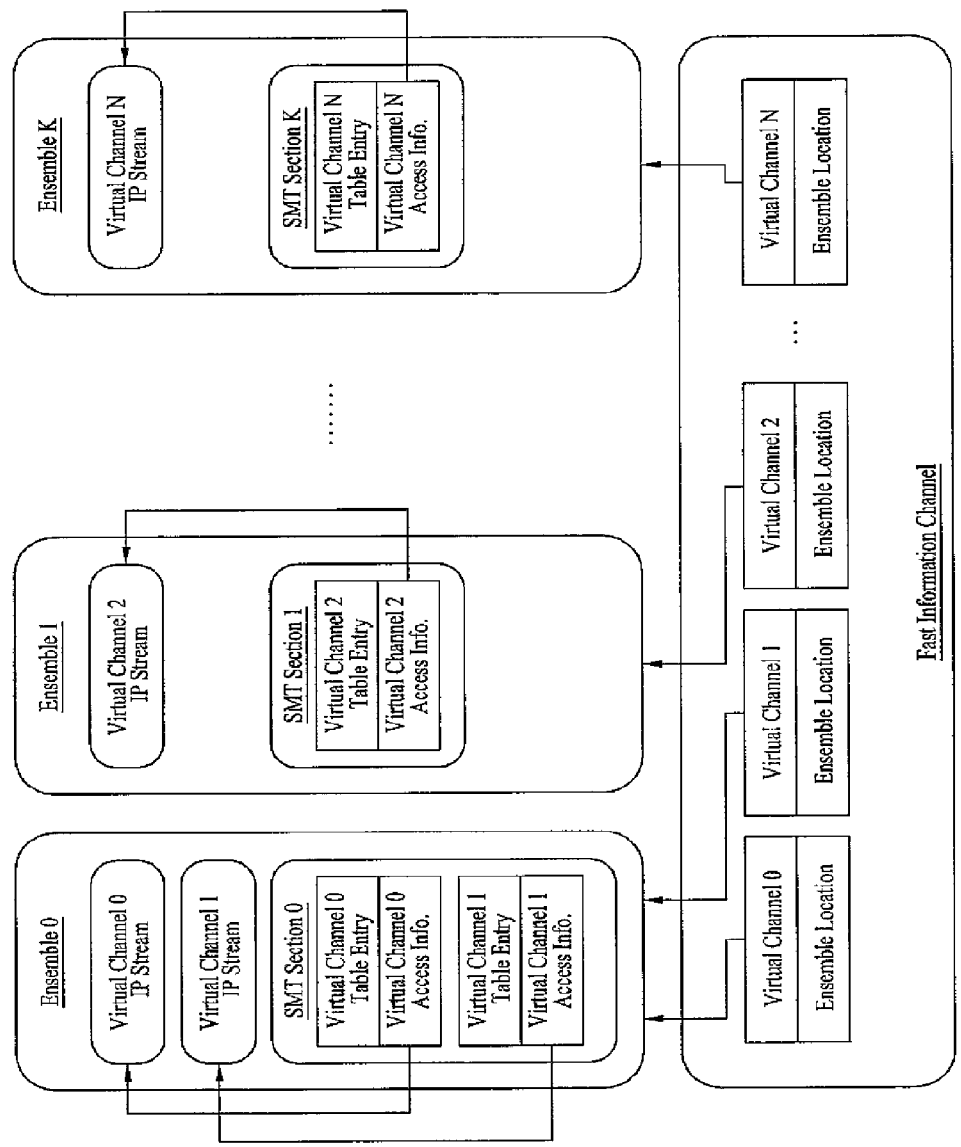
FIG. 13 illustrates a hierarchical signaling structure according to an embodiment of the present invent ion.

FIG. 13 illustrates a hierarchical signaling structure according to an embodiment of the present invention. As shown in FIG. 13, the mobile broadcasting technology according to the embodiment of the present invention adopts a signaling method using FIC and SMT. In the description of the present invention, the signaling structure will be referred to as a hierarchical signaling structure. Hereinafter, a detailed description on how the receiving system accesses a virtual channel via FIC and SMT will now be given with reference to FIG. 13. The FIC body defined in an MH transport (M1) identifies the physical, location of each the data stream for each virtual channel and provides very high level descriptions of each virtual channel. Being MH ensemble level signaling information, the service map table (SMT) provides MH ensemble level signaling information. The SMT provides the IP access information of each virtual channel belonging to the respective MH ensemble within which the SMT is carried. The SMT also provides all IP stream component level information required for the virtual channel service acquisition.

Referring to FIG. 13, each MH ensemble (i.e., Ensemble 0, Ensemble 1, . . . , Ensemble K) includes a stream information on each associated (or corresponding) virtual channel (e.g., virtual channel 0 IP stream, virtual channel 1 IP stream, and virtual channel 2 IP stream). For example, Ensemble 0 includes virtual channel 0 IP stream and virtual channel 1 IP stream. And, each MH ensemble includes diverse information on the associated virtual channel (i.e., Virtual Channel 0 Table Entry, Virtual Channel 0 Access Info, Virtual Channel 1 Table Entry, Virtual Channel 1 Access Info, Virtual Channel 2 Table Entry, Virtual Channel 2 Access Info, Virtual Channel N Table Entry, Virtual Channel N Access Info, and so on). The FIC body payload includes information on MB ensembles (e.g., ensemble_id field, and referred to as "ensemble location" in FIG. 13) and information on a virtual channel associated with the corresponding MH ensemble (e.g., when such information corresponds to a major_channel_num field and a minor_channel_num field, the information is expressed as Virtual Channel 0, Virtual Channel 1, . . . , Virtual Channel N in FIG. 13).

The application of the signaling structure in the receiving system will now be described in detail. When a user selects a channel he or she wishes to view (hereinafter, the user-selected channel will be referred to as "channel θ" for simplicity), the receiving system first parses the received FIC. Then, the receiving system acquires information on an MH ensemble (i.e., ensemble location), which is associated with the virtual channel corresponding to channel θ (hereinafter, the corresponding MH ensemble will be referred to as "MH ensemble θ" for simplicity). By acquiring slots only corresponding to the MH ensemble θ using the time-slicing method, the receiving system configures ensemble θ. The ensemble θ configured as described above, includes an SMT on the associated virtual channels (including channel θ) and IP streams on the corresponding virtual channels. Therefore, the receiving system uses the SMT included in the MH ensemble θ in order to acquire various information on channel θ (e.g., Virtual Channel θ Table Entry) and stream access information on channel θ (e.g., Virtual Channel θ Access Info). The receiving system uses the stream access information on channel θ to receive only the associated IP streams, thereby providing channel θ services to the user.

Fast Information Channel (FIC)

Figure 14:
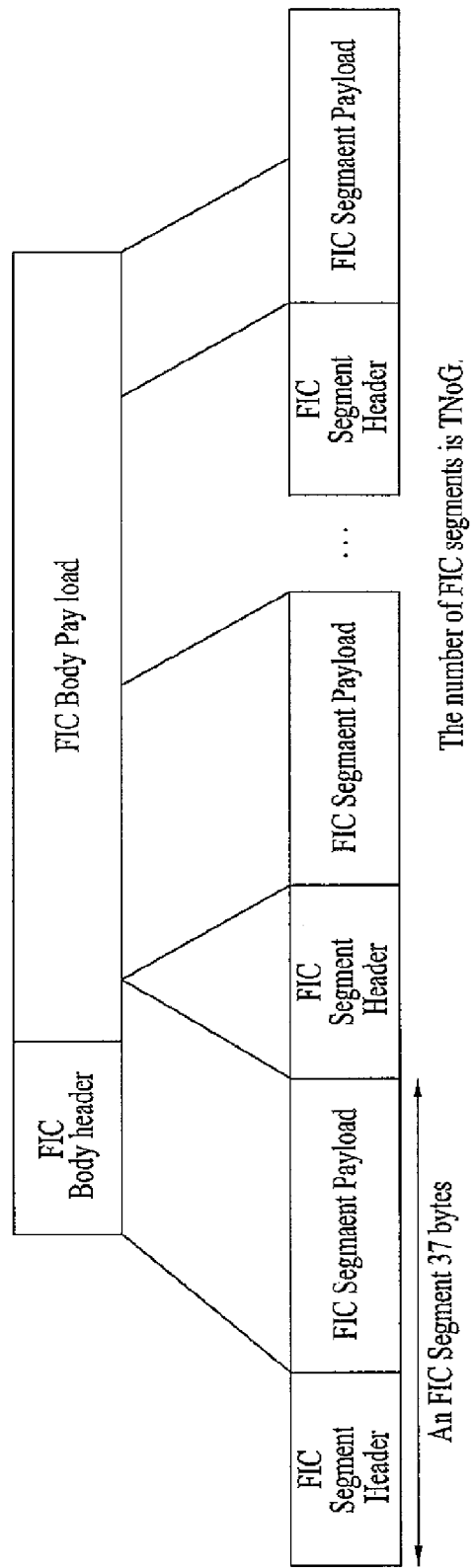
FIG. 14 illustrates an exemplary FIC body format according to an embodiment of the present invention.

The digital broadcast receiving system according to the present invention adopts the fast information channel (FIC) for a faster access to a service that is currently being broadcasted. More specifically, the FIC handler 215 of FIG. 1 parses the FIC body, which corresponds to an FIC transmission structure, and outputs the parsed result to the physical adaptation control signal handler 216. FIG. 14 illustrates an exemplary FIC body format according to an embodiment of the present invention. According to the embodiment of the present invention, the FIC format consists of an FIC body header and an FIC body payload.

Meanwhile, according to the embodiment of the present invention, data are transmitted through the FIC body header and the FIC body payload in FIC segment units. Each FIC segment has the size of 37 bytes, and each FIC segment consists of a 2-byte FIC segment header and a 35-byte FIC segment payload. More specifically, an FIC body configured of an FIC body header and an FIC body payload, is segmented in units of 35 data bytes, which are then carried in at least one FIC segment within the FIC segment payload, so as to be transmitted. In the description of the present invention, an example of inserting one FIC segment in one data group, which is then transmitted, will be given. In this case, the receiving system receives a slot corresponding to each data group by using a time-slicing method.

The signaling decoder 190 included in the receiving system shown in FIG. 1 collects each FIC segment inserted in each data group. Then, the signaling decoder 190 uses the collected FIC segments to created a single FIC body. Thereafter, the signaling decoder 190 performs a decoding process on the FIC body payload of the created FIC body, so that the decoded FIC body payload corresponds to an encoded result of a signaling encoder (not shown) included in the transmitting system. Subsequently, the decoded FIC body payload is outputted to the FIC handler 215. The FIC handler 215 parses the FIC data included in the FIC body payload, and then outputs the parsed FIC data to the physical adaptation control signal handler 216. The physical adaptation control signal handler 216 uses the inputted FIC data to perform processes associated with MH ensembles, virtual channels, SMTs, and so on.

According to an embodiment of the present invention, when an FIC body is segmented, and when the size of the last segmented portion is smaller than 35 data bytes, it is assumed that the lacking number of data bytes in the FIC segment payload is completed with by adding the same number of stuffing bytes therein, so that the size of the last FIC segment can be equal to 35 data bytes. However, it is apparent that the above-described data byte values (i.e., 37 bytes for the FIC segment, 2 bytes for the FIC segment header, and 35 bytes for the FIC segment payload) are merely exemplary, and will, therefore, not limit the scope of the present invention.

FIG. 15 illustrates an exemplary bit stream syntax structure with respect to an FIC segment according to an embodiment of the present invention. Herein, the FIC segment signifies a unit used for transmitting the FIC data. The FIC segment consists of an FIC segment header and an FIC segment payload. Referring to FIG. 15, the FIC segment payload corresponds to the portion starting from the 'for' loop statement. Meanwhile, the FIC segment header may include a FIC_type field, an error_indicator field, an FIC_seg_number field, and an FIC_last_seg_number field. A detailed description of each field will now be given.

The FIC_type field is a 2-bit field indicating the type of the corresponding FIC. The error_indicator field is a 1-bit field, which indicates whether or not an error has occurred within the FIC segment during data transmission. If an error has occurred, the value of the error_indicator field is set to '1'. More specifically, when an error that has failed to be recovered still remains during the configuration process of the FIC segment, the error_indicator field value is set to '1'. The error_indicator field enables the receiving system to recognize the presence of an error within the FIC data. The FIC_seg_number field is a 4-bit field. Herein, when a single FIC body is divided into a plurality of FIC segments and transmitted, the FIC_seg_number field indicates the number of the corresponding FIC segment. Finally, the FIC_last_seg_number field is also a 4-bit field. The FIC_last_seg_number field indicates the number of the last FIC segment within the corresponding FIC body.

FIG. 16 illustrates an exemplary bit stream syntax structure with respect to a payload of an FIC segment according to the present invention, when an FIC type field value is equal to '0'. According to the embodiment of the present invention, the payload of the FIC segment is divided into 3 different regions. A first region of the FIC segment payload exists only when the FIC_seg_number field value is equal to '0'. Herein, the first region may include a current_next_indicator field, an ESG_version field, and a transport_stream_id field. However, depending upon the embodiment of the present invention, it may be assumed that each of the 3 fields exists regardless of the FIC_seg_number field.

The current_next_indicator field is a 16-bit field. The current_next_indicator field acts as an indicator identifying whether the corresponding FIC data carry MH ensemble configuration information of an MH frame including the current FIC segment, or whether the corresponding FIC data carry MH ensemble configuration information of a next MH frame. The ESG_version field is a 5-bit field indicating ESG version information. Herein, by providing version information on the service guide providing channel of the corresponding ESG, the ESG_version field enables the receiving system to notify whether or not the corresponding ESG has been updated. Finally, the transport_stream_id field is a 16-bit field acting as a unique identifier of a broadcast stream through which the corresponding FIC segment is being transmitted.

A second region of the FIC segment payload corresponds to an ensemble loop region, which includes an ensemble_id field, an SI_version field, and a num_channel field. More specifically, the ensemble_id field is an 8-bit field indicating identifiers of an MH ensemble through which MH services are transmitted. The MH services will be described in more detail in a later process. Herein, the ensemble_id field binds the MH services and the MH ensemble. The SI_version field is a 4-bit field indicating version information of SI data included in the corresponding ensemble, which is being transmitted within the RS frame. Finally, the num_channel field is an 8-bit field indicating the number of virtual channel being transmitted via the corresponding ensemble.

A third region of the FIC segment payload a channel loop region, which includes a channel_type field, a channel_activity field, a CA_indicator field, a stand_alone_service_indicator field, a major_channel_num field, and a minor_channel_num field. The channel_type field is a 5-bit field indicating a service type of the corresponding virtual channel. For example, the channel_type field may indicates an audio/video channel, an audio/video and data channel, an audio-only channel, a data-only channel, a file download channel, an ESG delivery channel, a notification channel, and so on. The channel_activity field is a 2-bit field indicating activity information of the corresponding virtual channel. More specifically, the channel_activity field may indicate whether the current virtual channel is providing the current service.

The CA_indicator field is a 1-bit field indicating whether or not a conditional access (CA) is applied to the current virtual channel. The stand_alone_service_indicator field is also a 1-bit field, which indicates whether the service of the corresponding virtual channel corresponds to a stand alone service. The major_channel_num field is an 8-bit field indicating a major channel number of the corresponding virtual channel. Finally, the minor_channel_num field is also an 8-bit field indicating a minor channel number of the corresponding virtual channel.

Service Table Map

FIG. 17 illustrates an exemplary bit stream syntax structure of a service map table (hereinafter referred to as "SMT") according to the present invention. According to the embodiment of the present invention, the SMT is configured in an MPEG-2 private section format. However, this will not limit the scope and spirit of the present invention. The SMT according to the embodiment of the present invention includes description information for each virtual channel within a single MH ensemble. And, additional information may further be included in each descriptor area. Herein, the SMT according to the embodiment of the present invention includes at least one field and is transmitted from the transmitting system to the receiving system.

As described in FIG. 3, the SMT section may be transmitted by being included in the MH TP within the RS frame. In this case, each of the RS frame decoders 170 and 180, shown in FIG. 1, decodes the inputted RS frame, respectively. Then, each of the decoded RS frames is outputted to the respective RS frame handler 211 and 212. Thereafter, each RS frame handler 211 and 212 identifies the inputted RS frame by row units, so as to create an MH TP, thereby outputting the created MH TP to the MH TP handler 213. When it is determined that the corresponding MH TP includes an SMT section based upon the header in each of the inputted MB TP, the MH TP handler 213 parses the corresponding SMT section, so as to output the SI data within the parsed SMT section to the physical adaptation control signal handler 216. However, this is limited to when the SMT is not encapsulated to IP datagrams.

Meanwhile, when the SMT is not encapsulated to IP datagrams, and when it is determined that the corresponding MH TP includes an SMT section based upon the header in each of the inputted MH TP, the MH TP handler 213 outputs the SMT section to the IP network stack 220. Accordingly, the IP network stack 220 performs IP and UDP processes on the inputted SMT section and, then, outputs the processed SMT section to the SI handler 240. The SI handler 240 parses the inputted SMT section and controls the system so that the parsed SI data can be stored in the storage unit 290. The following corresponds to example of the fields that may be transmitted through the SMT.

The table_id field corresponds to an 8-bit unsigned integer number, which indicates the type of table section. The table_id field allows the corresponding table to be defined as the service map table (SMT). The ensemble_id field is an 8-bit unsigned integer field, which corresponds to an ID value associated to the corresponding MH ensemble. Herein, the ensemble_id field may be assigned with a value ranging from range '0x00' to '00x3F'. It is preferable that the value of the ensemble_id field is derived from the parade_id of the TPC data, which is carried from the baseband processor of MH physical layer subsystem. When the corresponding MH ensemble is transmitted through (or carried over) the primary RS frame, a value of '0' may be used for the most significant bit (MSB), and the remaining 7 bits are used as the parade_id value of the associated MR parade (i.e., for the least significant 7 bits). Alternatively, when the corresponding MR ensemble is transmitted through (or carried over) the secondary RS frame, a value of '1' may be used for the most significant bit (MSB).

The num_channels field is an 8-bit field, which specifies the number of virtual channels in the corresponding SMT section. Meanwhile, the SMT according to the embodiment of the present invention provides information on a plurality of virtual channels using the 'for' loop statement. The major_channel_num field corresponds to an 8-bit field, which represents the major channel number associated with the corresponding virtual channel. Herein, the major_channel_num field may be assigned with a value ranging from '0x00' to '0xFF'. The minor_channel_num field corresponds to an 8-bit field, which represents the minor channel number associated with the corresponding virtual channel. Herein, the minor_channel_num field may be assigned with a value ranging from '0x00' to '0xFF'.

The short_channel_name field indicates the short name of the virtual channel. The service_id field is a 16-bit unsigned integer number (or value), which identifies the virtual channel service. The service_type field is a 6-bit enumerated type field, which designates the type of service carried in the corresponding virtual channel as defined in Table 2 below.

TABLE 2

| | |
|---|---|
| 0x00 | [Reserved] |
| 0x01 | MH_digital_television field: the virtual channel carries television programming (audio, video and optional associated data) conforming to ATSC standards. |
| 0x02 | MH_audio field: the virtual channel carries audio programming (audio service and optional associated data) conforming to ATSC standards. |
| 0x03 | MH_data_only_service field: the virtual channel carries a data service conforming to ATSC standards, but no video or audio component. |
| 0x04 to 0xFF | [Reserved for future ATSC usage] |

The virtual_channel_activity field is a 2-bit enumerated field identifying the activity status of the corresponding virtual channel. When the most significant bit (MSB) of the virtual_channel_activity field is '1', the virtual channel is active, and when the most significant bit (MSB) of the virtual_channel_activity field is '0', the virtual channel is inactive. Also, when the least significant bit (LSB) of the virtual_channel_activity field is '1', the virtual channel is hidden (when set to 1), and when the least significant bit (LSB) of the virtual_channel_activity field is '0', the virtual channel is not hidden. The num_components field is a 5-bit field, which specifies the number of IP stream components in the corresponding virtual channel. The IP_version_flag field corresponds to a 1-bit indicator. More specifically, when the value of the IP_version_flag field is set to '1', this indicates that a source_IP_address field, a virtual_channel_target_IP_address field and a component_target_IP_address field are IPv6 addresses. Alternatively, when the value of the IP_version_flag field is set to '0', this indicates that the source_IP_address field, the virtual_channel_target_IP_address field, and the component_target_IP_address field are IPv4.

The source_IP_address_flag field is a 1-bit Boolean flag, which indicates, when set, that a source IP address of the corresponding virtual channel exist for a specific multicast source. The virtual_channel_target IP_address_flag field is a 1-bit Boolean flag, which indicates, when set, that the corresponding IP stream component is delivered through IP datagrams with target IP addresses different from the virtual_channel_target_IP_address. Therefore, when the flag is set, the receiving system (or receiver) uses the component_target_IP_address as the target_IP_address in order to access the corresponding IP stream component. Accordingly, receiving system (or receiver) may ignore the virtual_channel_target_IP_address field included in the num_channels loop.

The source_IP_address field corresponds to a 32-bit or 128-bit field. Herein, the source_IP_address field will be significant (or present), when the value of the source_IP_address_flag field is set to '1'. However, when the value of the source_IP_address_flag field is set to '0', the source_IP_address field will become insignificant (or absent). More specifically, when the source_IP_address_flag field value is set to '1', and when the IP_version_flag field value is set to '0', the source_IP_address field indicates a 32-bit IPv4 address, which shows the source of the corresponding virtual channel. Alternatively, when the IP_version_flag field value is set to '1', the source_IP_address field indicates a 128-bit IPv6 address, which shows the source of the corresponding virtual channel.

The virtual_channel_target_IP_address field also corresponds to a 32-bit or 128-bit field. Herein, the virtual_channel_target_IP_address field will be significant (or present), when the value of the virtual_channel_target_IP_address_flag field is set to '1'. However, when the value of the virtual_channel_target_IP_address_flag field is set to '0', the virtual_channel_target_IP_address field will become insignificant (or absent). More specifically, when the virtual_channel_target_IP_address_flag field value is set to '1', and when the IP_version_flag field value is set to '0', the virtual_channel_target_IP_address field indicates a 32-bit target IPv4 address associated to the corresponding virtual channel. Alternatively, when the virtual_channel_target_IP_address_flag field value is set to '1', and when the IP_version_flag field value is set to '1', the virtual_channel_target_IP_address field indicates a 64-bit target IPv6 address associated to the corresponding virtual channel. If the virtual_channel_target_IP_address field is insignificant (or absent), the component_target_IP_address field within the num_channels loop should become significant (or present). And, in order to enable the receiving system to access the IP stream component, the component_target_IP_address field should be used.

Meanwhile, the SMT according to the embodiment of the present invention uses a 'for' loop statement in order to provide information on a plurality of components. Herein, the RTP_payload_type field, which is assigned with 7 bits, identifies the encoding format of the component based upon Table 3 shown below. When the IP stream component is not encapsulated to RTP, the RTP_payload_type field shall be ignored (or deprecated). Table 3 below shows an example of an RTP payload type.

TABLE 3

| RTP_payload_type | Meaning |
| --- | --- |
| 35 | AVC video |
| 36 | MH audio |
| 37 to 72 | [Reserved for future ATSC use] |

The component_target_IP_address flag field is a 1-bit Boolean flag, which indicates, when set, that the corresponding IP stream component is delivered through IP datagrams with target IP addresses different from the virtual_channel_target_IP_address. Furthermore, when the component_target_IP_address_flag is set, the receiving system (or receiver) uses the component_target_IP_address field as the target_IP_address for accessing the corresponding IP stream component. Accordingly, the receiving system (or receiver) will ignore the virtual_channel_target_IP_address field included in the num_channels loop. The component_target_IP_address field corresponds to a 32-bit or 128-bit field. Herein, when the value of the IP_version_flag field is set to '0', the component_target_IP_address field indicates a 32-bit target IPv4 address associated to the corresponding IP stream component. And, when the value of the IP_version_flag field is set to '1', the component_target_IP_address field indicates a 128-bit target IPv6 address associated to the corresponding IP stream component.

The port_num_count field is a 6-bit field, which indicates the number of UDP ports associated with the corresponding IP stream component. A target UDP port number value starts from the target_UDP_port_num field value and increases (or is incremented) by 1. For the RTP stream, the target UDP port number should start from the target_UDP_port_num field value and shall increase (or be incremented) by 2. This is to incorporate RTCP streams associated with the RTP streams.

The target_UDP_port_num field is a 16-bit unsigned integer field, which represents the target UDP port number for the corresponding IP stream component. When used for RTP streams, the value of the target_UDP_port_num field shall correspond to an even number. And, the next higher value shall represent the target UDP port number of the associated RTCP stream. The component_level_descriptor( ) represents zero or more descriptors providing additional information on the corresponding IP stream component. The virtual_channel_level_descriptor( ) represents zero or more descriptors providing additional information for the corresponding virtual channel. The ensemble_level_descriptor( ) represents zero or more descriptors providing additional information for the MH ensemble, which is described by the corresponding SMT.

FIG. 18 illustrates an exemplary bit stream syntax structure of an MH audio descriptor according to the present invention. When at least one audio service is present as a component of the current event, the MH_audio_descriptor( ) shall be used as a component_level_descriptor of the SMT. The MH_audio_descriptor( ) may be capable of informing the system of the audio language type and stereo mode status. If there is no audio service associated with the current event, then it is preferable that the MH_audio_descriptor( ) is considered to be insignificant (or absent) for the current event. Each field shown in the bit stream syntax of FIG. 18 will now be described in detail.

The descriptor_tag field is an 8-bit unsigned integer having a TBD value, which indicates that the corresponding descriptor is the MH_audio_descriptor( ). The descriptor_length field is also an 8-bit unsigned integer, which indicates the length (in bytes) of the portion immediately following the descriptor_length field up to the end of the MH_audio_descriptor( ). The channel_configuration field corresponds to an 8-bit field indicating the number and configuration of audio channels. The values ranging from '1' to '6' respectively indicate the number and configuration of audio channels as given for "Default bit stream index number" in Table 42 of ISO/IEC 13818-7:2006. All other values indicate that the number and configuration of audio channels are undefined.

The sample_rate_code field is a 3-bit field, which indicates the sample rate of the encoded audio data. Herein, the indication may correspond to one specific sample rate, or may correspond to a set of values that include the sample rate of the encoded audio data as defined in Table A3.3 of ATSC A/52B. The bit_rate_code field corresponds to a 6-bit field. Herein, among the 6 bits, the lower 5 bits indicate a nominal bit rate. More specifically, when the most significant bit (MSB) is '0', the corresponding bit rate is exact. On the other hand, when the most significant bit (MSB) is '0', the bit rate corresponds to an upper limit as defined in Table A3.4 of ATSC A/53B. The ISO_639_language_code field is a 24-bit (i.e., 3-byte) field indicating the language used for the audio stream component, in conformance with ISO 639.2/B [x]. When a specific language is not present in the corresponding audio stream component, the value of each byte will be set to '0x00'.

FIG. 19 illustrates an exemplary bit stream syntax structure of an MH RTP payload type descriptor according to the present invention. The MH_RTP_payload_type_descriptor( ) specifies the RTP payload type. Yet, the MH_RTP_payload_type_descriptor( ) exists only when the dynamic value of the RTP_payload_type field within the num_components loop of the SMT is in the range of '96' to '127'. The MH_RTP_payload_type_descriptor( ) is used as a component_level_descriptor of the SMT. The MH_RTP_payload_type_descriptor translates (or matches) a dynamic RTP_payload_type field value into (or with) a MIME type. Accordingly, the receiving system (or receiver) may collect (or gather) the encoding format of the IP stream component, which is encapsulated in RTP. The fields included in the MH_RTP_payload_type_descriptor( ) will now be described in detail.

The descriptor_tag field corresponds to an 8-bit unsigned integer having the value TBD, which identifies the current descriptor as the MH_RTP_payload_type_descriptor( ). The descriptor_length field also corresponds to an 8-bit unsigned integer, which indicates the length (in bytes) of the portion immediately following the descriptor_length field up to the end of the MH_RTP_payload_type_descriptor( ). The RTP_payload_type field corresponds to a 7-bit field, which identifies the encoding format of the IP stream component. Herein, the dynamic value of the RTP_payload_type field is in the range of '96' to '127'. The MIME_type_length field specifies the length (in bytes) of the MIME_type field. The MIME_type field indicates the MIME type corresponding to the encoding format of the IP stream component, which is described by the MH_RTP_payload_type_descriptor( ).

FIG. 20 illustrates an exemplary bit stream syntax structure of an MH current event descriptor according to the present invention. The MH_current_event_descriptor( ) shall be used as the virtual_channel_level_descriptor( ) within the SMT. Herein, the MH_current_event_descriptor( ) provides basic information on the current event (e.g., the start time, duration, and title of the current event, etc.), which is transmitted via the respective virtual channel. The fields included in the MH_current_event_descriptor( ) will now be described in detail.

The descriptor_tag field corresponds to an 8-bit unsigned integer having the value TBD, which identifies the current descriptor as the MH_current_event_descriptor( ). The descriptor_length field also corresponds to an 8-bit unsigned integer, which indicates the length (in bytes) of the portion immediately following the descriptor_length field up to the end of the MH_current_event_descriptor( ). The current_event_start_time field corresponds to a 32-bit unsigned integer quantity. The current_event_start_time field represents the start time of the current event and, more specifically, as the number of GPS seconds since 00:00:00 UTC, Jan. 6, 1980. The current_event_duration field corresponds to a 24-bit field. Herein, the current_event_duration field indicates the duration of the current event in hours, minutes, and seconds (wherein the format is in 6 digits, 4-bit BCD=24 bits). The title_length field specifies the length (in bytes) of the title_text field. Herein, the value '0' indicates that there are no titles existing for the corresponding event. The title_text field indicates the title of the corresponding event in event title in the format of a multiple string structure as defined in ATSC A/65C [x].

FIG. 21 illustrates an exemplary bit stream syntax structure of an MH next event descriptor according to the present invention. The optional MH_next_event_descriptor( ) shall, be used as the virtual_channel_level_descriptor( ) within the SMT. Herein, the MH_next_event_descriptor( ) provides basic information on the next event (e.g., the start time, duration, and title of the next event, etc.), which is transmitted via the respective virtual channel. The fields included in the MH_next_event_descriptor( ) will now be described in detail.

The descriptor_tag field corresponds to an 8-bit unsigned integer having the value TBD, which identifies the current descriptor as the MH_next_event_descriptor( ). The descriptor_length field also corresponds to an 8-bit unsigned integer, which indicates the length (in bytes) of the portion immediately following the descriptor_length field up to the end of the MH_next_event_descriptor( ). The next_event_start_time field corresponds to a 32-bit unsigned integer quantity. The next_event_start_time field represents the start time of the next event and, more specifically, as the number of GPS seconds since 00:00:00 UTC, Jan. 6, 1980. The next_event_duration field corresponds to a 24-bit field. Herein, the next_event_duration field indicates the duration of the next event in hours, minutes, and seconds (wherein the format is in 6 digits, 4-bit BCD=24 bits). The title_length field specifies the length (in bytes) of the title_text field. Herein, the value '0' indicates that there are no titles existing for the corresponding event. The title_text field indicates the title of the corresponding event in event title in the format of a multiple string structure as defined in ATSC A/65C [x].

FIG. 22 illustrates an exemplary bit stream syntax structure of an MH system time descriptor according to the present invention. The MH_system_time_descriptor( ) shall be used as the ensemble_level_descriptor( ) within the SMT. Herein, the MH_system_time_descriptor( ) provides information on current time and date. The MH_system_time_descriptor( ) also provides information on the time zone in which the transmitting system (or transmitter) transmitting the corresponding broadcast stream is located, while taking into consideration the mobile/portable characterstics of the MH service data. The fields included in the MH_system_time_descriptor( ) will now be described in detail.

The descriptor_tag field corresponds to an 8-bit unsigned integer having the value TBD, which identifies the current descriptor as the MH_system_time descriptor( ). The descriptor_length field also corresponds to an 8-bit unsigned integer, which indicates the length (in bytes) of the portion immediately following the descriptor_length field up to the end of the MH_system_time_descriptor( ). The system_time field corresponds to a 32-bit unsigned integer quantity. The system_time field represents the current system time and, more specifically, as the number of GPS seconds since 00:00:00 UTC, Jan. 6, 1980. The GPS_UTC_offset field corresponds to an 8-bit unsigned integer, which defines the current offset in whole seconds between GPS and UTC time standards. In order to convert GPS time to UTC time, the GPS_UTC_offset is subtracted from GPS time. Whenever the International Bureau of Weights and Measures decides that the current offset is too far in error, an additional leap second may be added (or subtracted). Accordingly, the GPS_UTC_offset field value will reflect the change.

The time_zone_offset_polarity field is a 1-bit field, which indicates whether the time of the time zone, in which the broadcast station is located, exceeds (or leads or is faster) or falls behind (or lags or is slower) than the UTC time. When the value of the time_zone_offset_polarity field is equal to '0', this indicates that the time on the current time zone exceeds the UTC time. Therefore, the time_zone_offset_polarity field value is added to the UTC time value. Conversely, when the value of the time_zone_offset_polarity field is equal to '1', this indicates that the time on the current time zone falls behind the UTC time. Therefore, the time_zone_offset_polarity field value is subtracted from the UTC time value.

The time_zone_offset field is a 31-bit unsigned integer quantity. More specifically, the time_zone_offset field represents, in GPS seconds, the time offset of the time zone in which the broadcast station is located, when compared to the UTC time. The daylight_savings field corresponds to a 16-bit field providing information on the Summer Time (i.e., the Daylight Savings Time). The time_zone field corresponds to a (5×8)-bit field indicating the time zone, in which the transmitting system (or transmitter) transmitting the corresponding broadcast stream is located.

Figure 23:
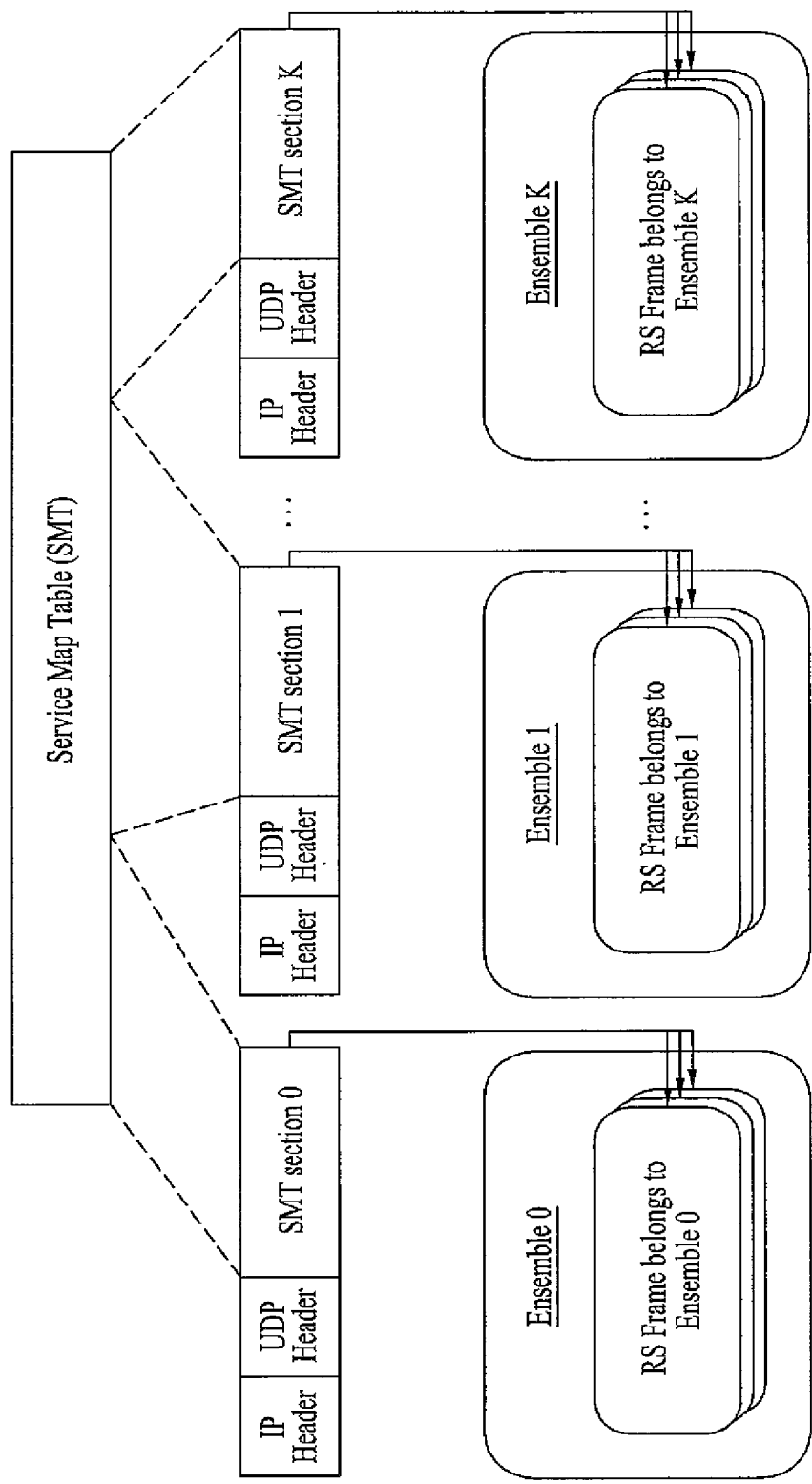
FIG. 23 illustrates segmentation and encapsulation processes of a service map table according to the present invention.

FIG. 23 illustrates segmentation and encapsulation processes of a service map table (SMT) according to the present invention. According to the present invention, the SMT is encapsulated to UDP, while including a target IP address and a target UDP port number within the IP datagram. More specifically, the SMT is first segmented into a predetermined number of sections, then encapsulated to a UDP header, and finally encapsulated to an IP header. In addition, the SMT section provides signaling information on all virtual channel included in the MH ensemble including the corresponding SMT section. At least one SMT section describing the MH ensemble is included in each RS frame included in the corresponding MH ensemble. Finally, each SMT section is identified by an ensemble_id included in each section. According to the embodiment of the present invention, by informing the receiving system of the target IP address and target UDP port number, the corresponding data (i.e., target IP address and target UDP port number) may be parsed without having the receiving system to request for other additional information.

Figure 24:
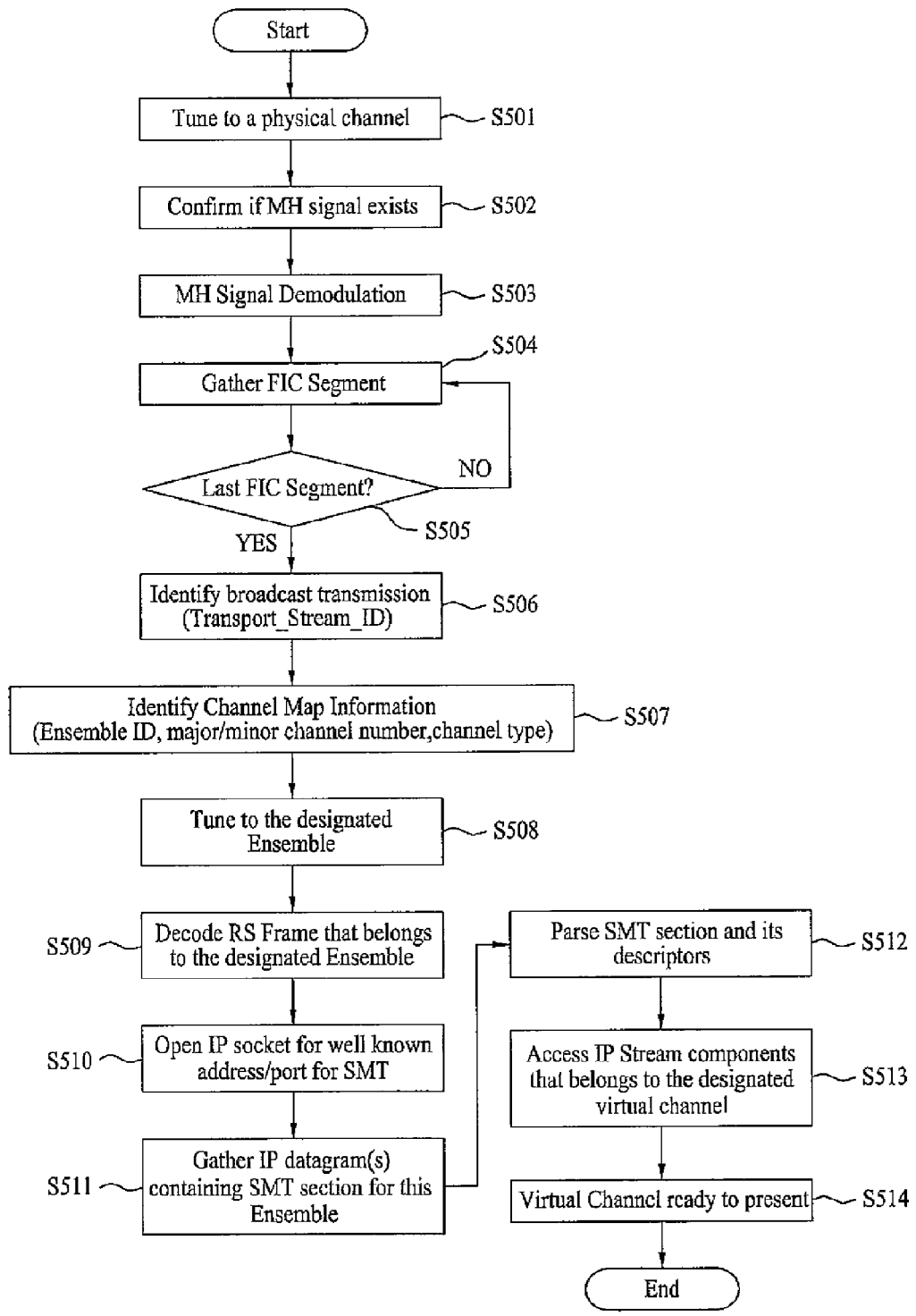
FIG. 24 illustrates a flow chart for accessing a virtual channel using FIC and SMT according to the present invention.

FIG. 24 illustrates a flow chart for accessing a virtual channel using FIC and SMT according to the present invention. More specifically, a physical channel is tuned (S501). And, when it is determined that an MH signal exists in the tuned physical channel (S502), the corresponding MH signal is demodulated (S503). Additionally, FIC segments are grouped from the demodulated MH signal in sub-frame units (S504 and S505). According to the embodiment of the present invention, an FIC segment is inserted in a data group, so as to be transmitted. More specifically, the FIC segment corresponding to each data group described service information on the MH ensemble to which the corresponding data group belongs.

When the FIC segments are grouped in sub-frame units and, then, deinterleaved, all service information on the physical channel through which the corresponding FIC segment is transmitted may be acquired. Therefore, after the tuning process, the receiving system may acquire channel information on the corresponding physical channel during a sub-frame period. Once the FIC segments are grouped, in S504 and S505, a broadcast stream through which the corresponding FIC segment is being transmitted is identified (S506). For example, the broadcast stream may be identified by parsing the transport_stream_id field of the FIC body, which is configured by grouping the FIC segments. Furthermore, an ensemble identifier, a major channel number, a minor channel number, channel type information, and so on, are extracted from the FIC body (S507). And, by using the extracted ensemble information, only the slots corresponding to the designated ensemble are acquired by using the time-slicing method, so as to configure an ensemble (S508).

Subsequently, the RS frame corresponding to the designated ensemble is decoded (S509), and an IP socket is opened for SMT reception (S510). According to the example given in the embodiment of the present invention, the SMT is encapsulated to UDP, while including a target IP address and a target UDP port number within the IP datagram. More specifically, the SMT is first segmented into a predetermined number of sections, then encapsulated to a UDP header, and finally encapsulated to an IP header. According to the embodiment of the present invention, by informing the receiving system of the target IP address and target UDP port number, the receiving system parses the SMT sections and the descriptors of each SMT section without requesting for other additional information (S511).

The SMT section provides signaling information on all virtual channel included in the MR ensemble including the corresponding SMT section. At least one SMT section describing the MH ensemble is included in each RS frame included in the corresponding MH ensemble. Also, each SMT section is identified by an ensemble_id included in each section. Furthermore each SMT provides IP access information on each virtual channel subordinate to the corresponding MH ensemble including each SMT. Finally, the SMT provides IP stream component level information required for the servicing of the corresponding virtual channel. Therefore, by using the information parsed from the SMT, the IP stream component belonging to the virtual channel requested for reception may be accessed (S513). Accordingly, the service associated with the corresponding virtual channel is provided to the user (S514).

Hereinafter, transmission/reception of service data having a format different from the existing MH format in an MB system according to another embodiment of the present invention will be described. At this time, the service having the different format includes a MediaFLO service for providing a mobile broadcasting service of a subscription base via a single physical channel. Hereinafter, for convenience of description, for example, the MediaFLO service will be described, but the present invention is not limited thereto.

In order to transmit/receive data for the MediaFLO service in the MH system, the data for the MediaFLO service should be changed to a transmission/reception format of the MH system. An interface between layers on the existing MH system and layers for the MediaFLO service should be performed.

Hereinafter, a protocol stack for transmitting/receiving data for the MediaFLO service in the MH system will be described.

Figure 25:
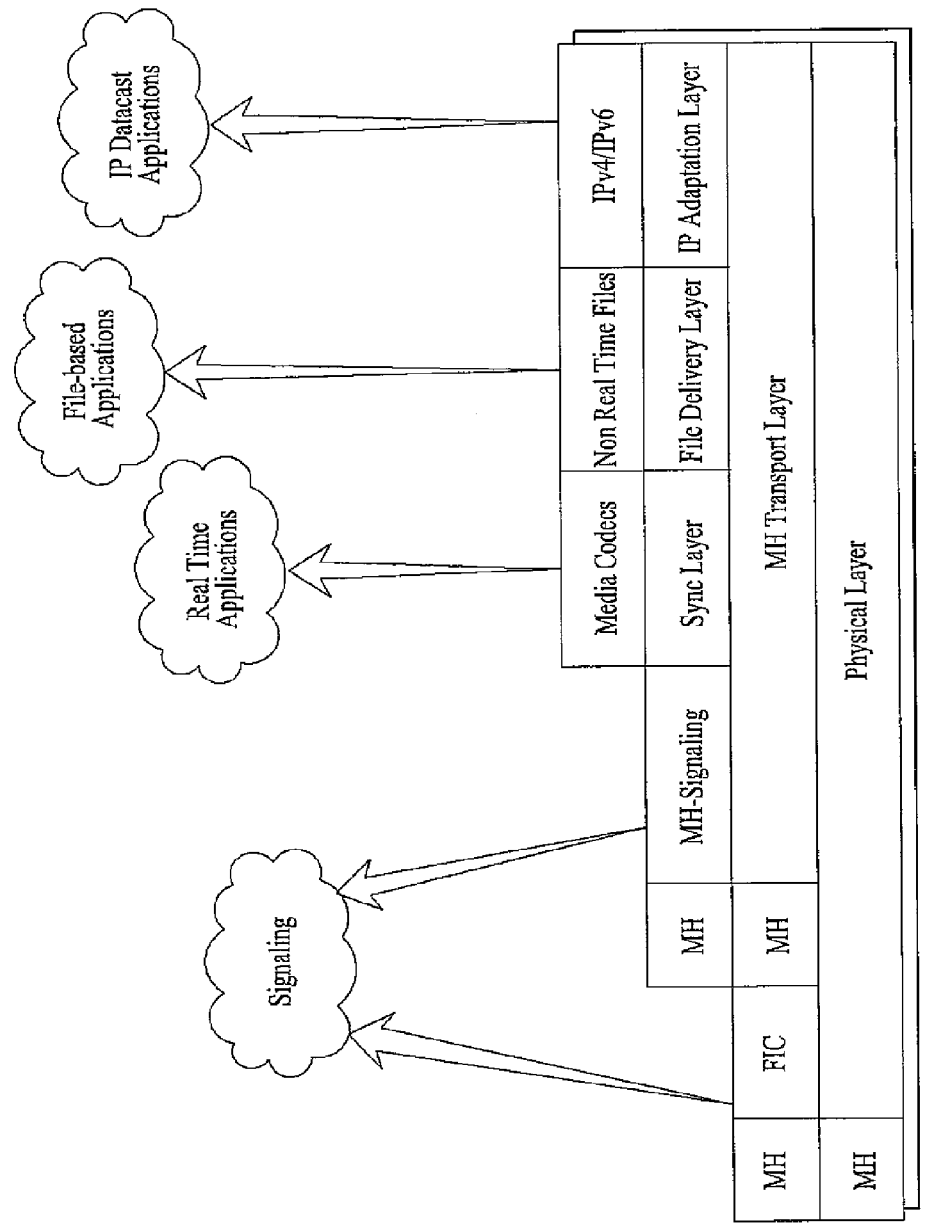
FIG. 25 is a view showing a protocol stack of an MH system according to an embodiment of the present invention.

FIG. 25 is a view showing a protocol stack of an MH system according to an embodiment of the present invention.

Hereinafter, referring to FIG. 25, for transmission/reception of the MediaFLO service data in the MH system, an interface between an MH transport layer and a media adaptation layer of the MediaFLO will be defined and signaling data associated with the transmission/reception will be defined.

The embodiment of the protocol stack in the MH system shown in FIG. 25 is the structure that data for the MediaFLO service is interfaced via a sync layer, a file delivery layer and an Internet Protocol (IP) adaptation layer in association with the MediaFLO service and is transmitted via an MH transport layer and an MH physical layer. The protocol stack deals with signaling, that is, an MH signaling layer, in association with the interface in the MH system of the MediaFLO service data.

The protocol stack shown in FIG. 25 includes a media codecs layer, a non-real time files layer and an IPv4/IPv6 layer, all of which are used to transmit the data for the MediaFLO service, and includes the sync layer, the file delivery layer and the IP adaptation layer, all of which enable the data for the MediaFLO service downloaded from the layers to be interfaced with the MH system.

The media codecs layer is a layer for a real-time applications service, the non-real time files layer is a layer for a file-based applications service, and the IPv4/IPv6 layer is a layer for an IP datacast applications service. At this time, the detailed description of the layers associated with the Media-FLO service will refer to, for example, the TIA-1130 (media adaptation layer) and will be omitted herein, for convenience of description. In association with the MediaFLO service, the non-real time files layer, the file delivery layer, the IPv4/IPv6 layer and the IP adaptation layer may be defined in the existing MH format and may be transmitted.

In the protocol stack, the FIC layer and the MH-signaling layer are layers for signaling in the MH system. The MH transport layer and the MH physical layer are layers for packetizing the data for the interfaced MediaFLO service and transmitting the packetized data.

The detailed description of the interface and the signaling associated with the protocol stack of the MH system will be described later.

Figure 26:
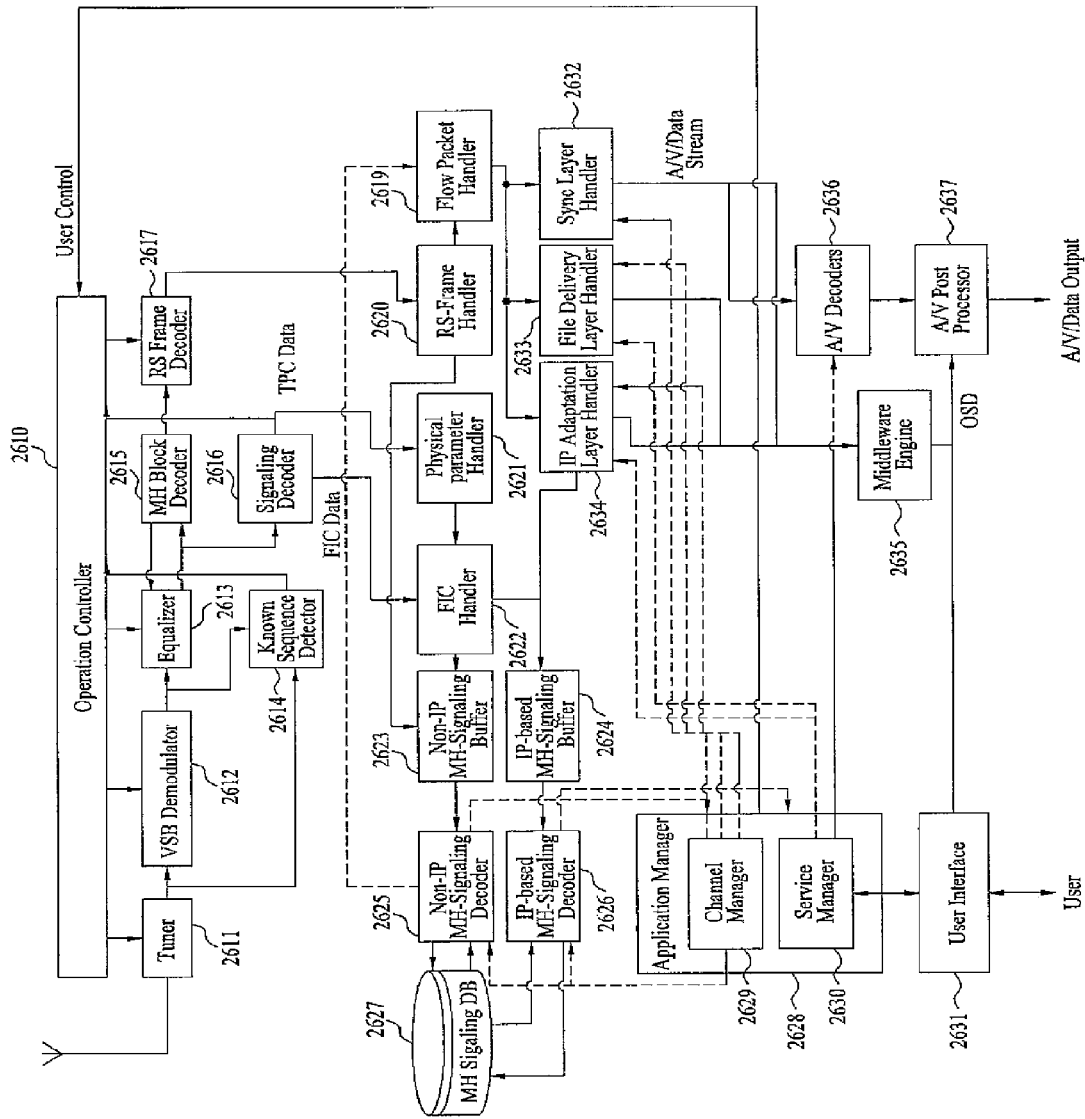
FIG. 26 is a conceptual block diagram of an MH receiver according to another embodiment of the present invention.

FIG. 26 is a conceptual block diagram of an MH receiver according to another embodiment of the present invention.

Referring to FIG. 26, the MH receiver according to another embodiment of the present invention includes a flow packet handler 2619, an RS-frame handler 2620, a physical parameter handler 2621, an FIC handler 2622, a non-IP MH-signaling decoder 2625, an IP-based MH-signaling decoder 2626, a sync layer handler 2632, a file delivery layer handler 2633, an IP adaptation layer handler 2634, an MH-signaling database 2627, a channel manager 2629 and a service manager 2630.

Hereinafter, a process of receiving and processing data for a MediaFLO service transmitted according to the protocol stack shown in FIG. 25 in the MH system and the configuration thereof will be mainly described. The same portions as the configuration of the MH receiver according to the embodiment of the present invention shown in FIG. 1 will cite the above description. A dotted line of FIG. 26 denotes the flow of control data and a solid line denotes the flow of actual data. The control data collectively indicate a variety of supplementary information used for processing the data for the MediaFLO service. The below-described layers indicate the layers of the protocol stack of FIG. 25.

The RS-frame handler 2620 processes an RS-frame which is output from the MH physical layer. The signaling information associated with the MediaFLO service in the processed RS-frame is transmitted to the non-IP MH signaling buffer 2623 and a flow packet associated with the MediaFLO service is transmitted to the flow packet handler 2619.

The flow packet handler 2619 receives the flow packet from the RS-frame handler 2620, extracts type information in the header of the received flow packet, and selects a handler associated with the flow packet from the sync layer handler 2632, the file delivery layer handler 2633 and the IP adaptation layer handler 2634 according to the extracted type information. The flow packet handler 2619 transmits the received flow packet so as to be processed by the selected handler.

The physical parameter handler 2621 processes a physical layer parameter required by a management layer or higher layer.

The FIC handler 2622 processes FIC data. At this time, in order to process the FIC data, parameters of the physical layer are necessary. The parameters of the physical layer are obtained from TPC data, which is decoded and transmitted by the signaling decoder 2616, by the physical parameter handler 2621.

The non-IP MH-signaling decoder 2625 receives and processes MH-signaling information transmitted via the FIC handler 2622 and non-IP MH-signaling information transmitted by the RS-frame.

The IP-based MH-signaling decoder 2626 processes the MH-signaling information transmitted via the FIC handler 2622 and IP-based MH-signaling information transmitted by the RS-frame.

The sync layer handler 2632 receives and processes the flow packet including data delivered in the sync layer among the flow packets configuring the RS-frame from the flow packet handler 2619.

The file delivery layer handler 2633 receives and processes the flow packet including the data delivered in the file delivery layer among the flow packets configuring the RS-frame from the flow packet handler 2619.

The IP adaptation layer handler 2634 receives and processes the flow packet including the data delivered in the IP adaptation layer among the flow packets configuring the RS-frame from the flow packet handler 2619.

The MH-signaling database 2627 stores the signaling data received in the non-IP or IP format and outputs the stored signaling data when the stored signaling data is to be needed.

The channel manager 2629 manages a user input such as channel setting by the MH user interface.

The service manager 2630 manages the user input such as service setting using an EPG display and an MPG by the MH user interface.

The control data may be, for example, transmitted in a state of being included in a service map table or an electronic service guide (ESG), but the present invention is not limited thereto. That is, the control data may be transmitted by other methods. The MH receiver according to another embodiment of the present invention can obtain information required for the configuration of the control data from other data transmitted. The control data may be, for example, stored in the MH-signaling database 2627 or a separate storage space or may be received, extracted and used in real time according to the characteristics of the control data. For example, if the MediaFLO service is used according to the request of the user, the MH receiver stores the control data associated with the service in the MH-signaling database 2627 or a separate stable storage space and extracts the data or extracts the data in real time, and transmits the data to the flow packet handler 2619 or the RS-frame handler 2620. Accordingly, the flow packet handler 2619 or the RS-frame handler 2620 may process the MediaFLO service data using the extracted control data.

Figure 27:
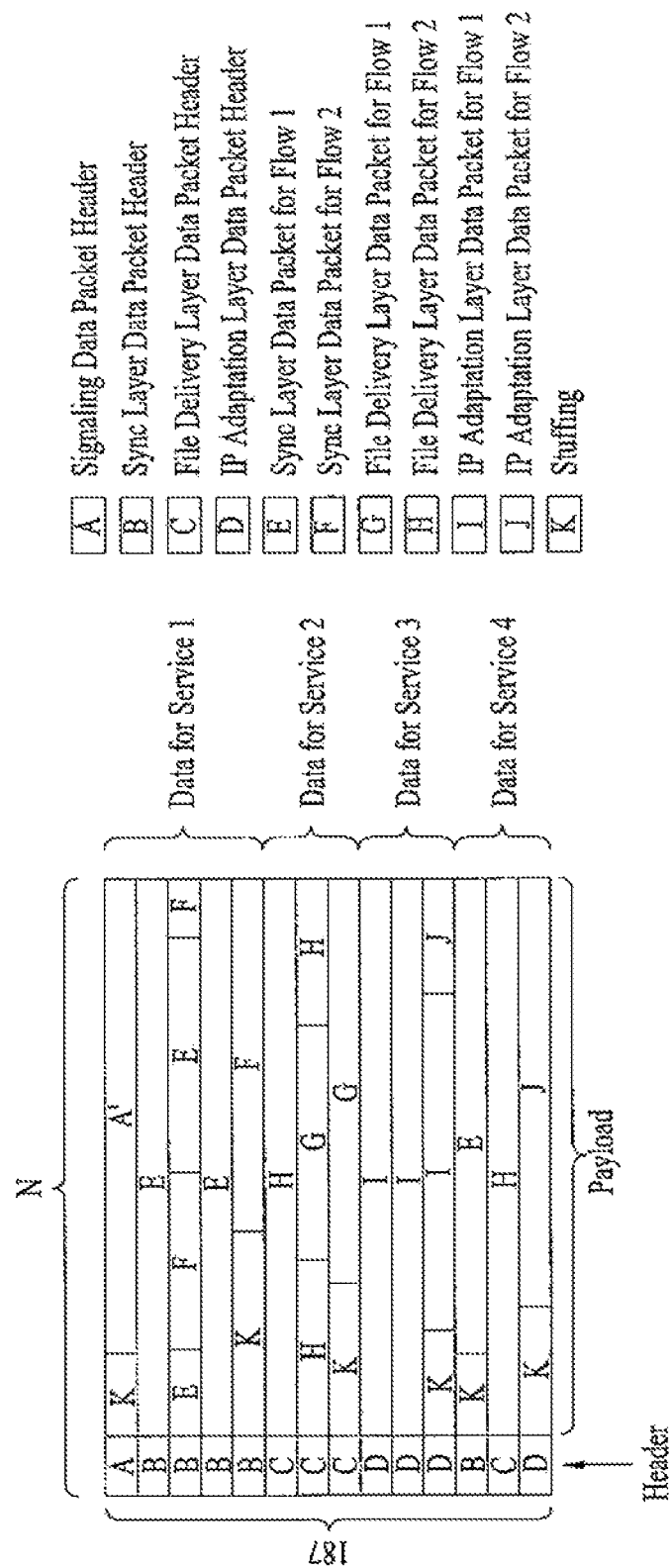
FIG. 27 is a view showing the structure of a RS frame including a multiplexed data packet according to another embodiment of the present invention.

Next, the structure of the RS frame and data packet multiplexing according to another embodiment of the present invention will be described. FIG. 27 is a view showing the structure of an RS frame including a multiplexed data packet according to another embodiment of the present invention.

FIG. 27 shows, for example, the format of the RS frame for transmitting data corresponding to an MH ensemble per MH frame as the output of an MH physical layer subsystem.

One RS frame may transmit a plurality of MH services. A plurality of data configuring one MH service may be continuously transmitted in the RS frame in a state of forming one zone. One MH service may be configured by a plurality of flow packets.

The RS frame is configured in the form of a two-dimensional byte array of 187×N bytes. Accordingly, in the MH transport layer, each row of the RS frame configures the MH transport packet (MH TP).

Figure 28:
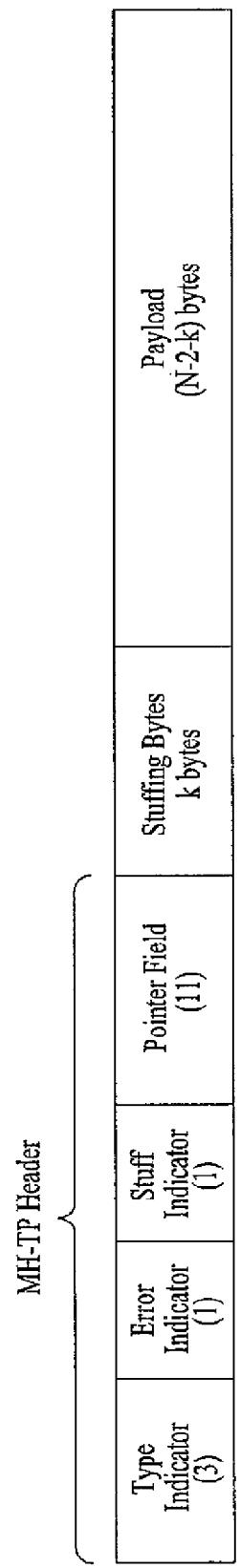
FIG. 28 is a view showing the structure of an MH transport packet (MH TP) according to an embodiment of the present invention.

FIG. 28 is a view showing the structure of an MH TP according to an embodiment of the present invention.

Referring to FIG. 28, one MH TP is configured by an MH TP header (2 bytes) and an MH TP payload (N−2 bytes).

The MH TP header includes, for example, a type indicator field, an error indicator field, a stuff indicator field and a pointer field. Hereinafter, the fields will be described.

First, the type indicator field (3 bits) indicates the type of the data carried in a payload portion of the MH TP. At this time, the field value and the meaning thereof may be defined as shown in Table 4.

TABLE 4

| Type Indicator | Meaning |
| --- | --- |
| 000 | MH Signaling Data |
| 001 | IP Datagram |
| 010 | Sync Layer Data |
| 011 | File Delivery Layer Data |
| 100 | IP Adaptation Layer Data |
| 101-111 | Reserved |

Referring to Table 4, the type of the data carried in the payload of the MH TP is MH signaling data if the value of the type indicator field is "000", the type of the data carried in the payload of the MH TP is IP datagram if the value of the type indicator field is "001", the type of the data carried in the payload of the MH TP is sync layer data if the value of the type indicator field is "010", the type of the data carried in the payload of the MH TP is file delivery layer data if the value of the type indicator field is "011", and the type of the data carried in the payload of the MH TP is IP adaptation layer data if the value of the type indicator field is "100". The values of the type indicator field of "101" to "111" are reserved for future use.

The type of the service transmitted/received in the MH system may be identified by the value of the type indicator field. For example, if the value of the type indicator field is "010" to "100", the receiver can recognize that the data for the MediaFLO service is transmitted via the MH TP, from the value of the field. If the value of the field is "000" which indicates the MH signaling data, or "001" which indicates the IP datagram, the data is included in the MH TP having the existing MH format and the detailed description thereof will cite the above description.

The error indicator field (1 bit) is an indicator indicating whether or not an error is included in the MH TP. At this time, it is indicated that the error is not found if the value of the error indicator field is "0" and it is indicated that the error is found if the value of the error indicator field is "1", thereby indicating the existence/nonexistence of the error.

The stuff indicator field (1 bit) is an indicator indicating whether or not stuffing bytes are included in the MB TP. At this time, it is indicated that the stuffing bytes do not exist if the value of the stuff indicator field is "0" and it is indicated that a start portion of the packet payload is the stuff indicator field if the value of the stuff indicator field is "1", thereby indicating the existence/nonexistence of the stuffing bytes. The stuffing bytes indicate the stuffing K bytes which are included in one MH TP, if necessary, and the stuffing bytes including the K bytes may be the start portion of the packet payload. If the length of the stuff indicator field is 1 byte, the value of a first byte of the stuff indicator field may be set to "0xFF". If the length of the stuff indicator field is 2 bytes, the value of the first byte of the stuff indicator field is set to "0xEE" and the value of the second byte of the stuff indicator field is set to "0xFF". If the length of the stuff indicator field is 2 bytes or more, the value of first two bytes of the field may indicate the number of bytes in the stuff indicator field.

The pointer field (11 bits) indicates the start point of a new packet in the payload of the MH TP. The start point of the new packet may indicate, for example, the start point of the flow packet header.

The values of the fields in the MH TP header are exemplary for convenience of description and the present invention is not limited thereto.

Next, one MH TP includes a stuffing portion (K bytes) and a payload portion (N−2−K bytes) in addition to the MH TP header. At this time, the stuffing portion and the payload portion may be collectively called a payload.

The structure of the RS frame in which a plurality of data packets for the MediaFLO service shown in FIG. 27 is multiplexed will be described. In the RS frame, data packets A to K are multiplexed.

In the structure of the RS frame, the type of the data packet included in the RS frame payload portion of each row is described in a left column called the RS frame header. For example, in the RS frame shown in FIG. 27, the RS frame header portion of a first row is represented by 'A', which indicates that the signaling data packet header is included in the payload portion of the first row. If any one of 'B' to 'D' is represented in the RS frame header of a specific row of the RS frame in the same manner, it is indicated that the data packet indicated by any one of 'B' to 'D' is included in the RS frame payload of the specific row.

FIG. 27 shows an example of multiplexing data for four services 1 to 4. That is, Service 1 is a service including a sync layer packet, Service 2 is a service including a file delivery layer packet, Service 3 is a service including an IP adaptation layer packet, and Service 4 is a service including the above-described packets. It can be seen that the service packets are transmitted via different flow packets.

Figure 29:
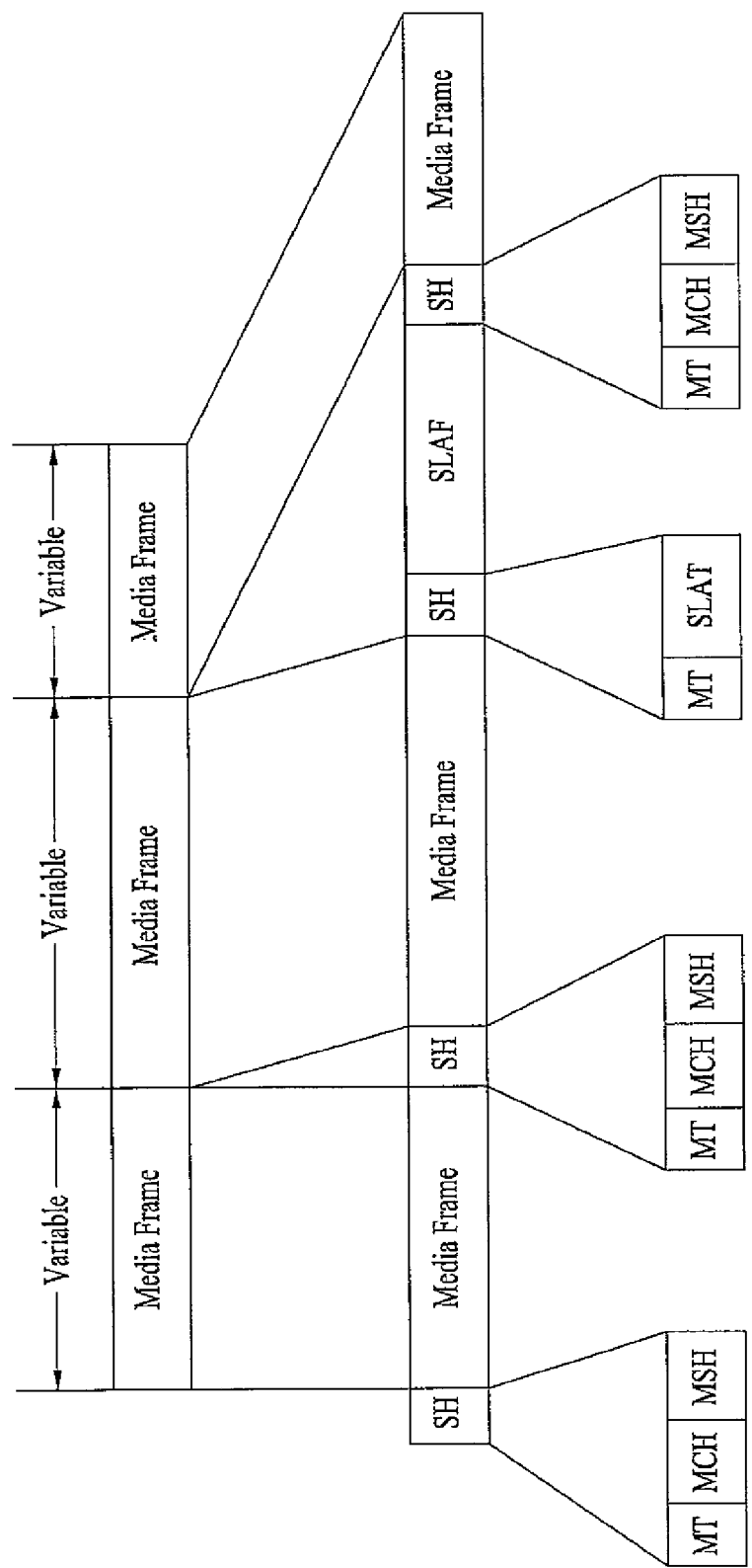
FIG. 29 is a view showing a process of packetizing data in a sync layer according to an embodiment of the present invention.

Next, a process of packetizing and transmitting data associated with a sync layer in association with the Media-FLO service will be described. FIG. 29 is a view showing a process of packetizing data in a sync layer according to an embodiment of the present invention.

The sync layer functions as an interface between a media codecs layer and an MH transport layer, for transmission of data for real time applications in an MH system as described above. At this time, the real time applications include, for example, a video, an audio, and a timed text.

FIG. 29 shows a process of packetizing media frames downloaded from the media codecs layer in the sync layer.

The media frames having variable lengths are downloaded from the media codecs layer in the sync layer. The sync headers are prefixed to the downloaded media frames so as to configure the sync layer packets. At this time, a packet configured by prefixing a header to a sync layer adaptation frame (SLAF) may be inserted between the sync layer packets.

The sync header may include a media type (MT), a media common header (MCH), a media specific header (MSH) and a sync layer adaptation type (SLAT). For example, in FIG.

29, each of the headers prefixed in the process of packetizing the media frames includes the MT, the MCH and the MSH. The header for packetizing the SLAF includes the MT and the SLAT.

Figure 30:
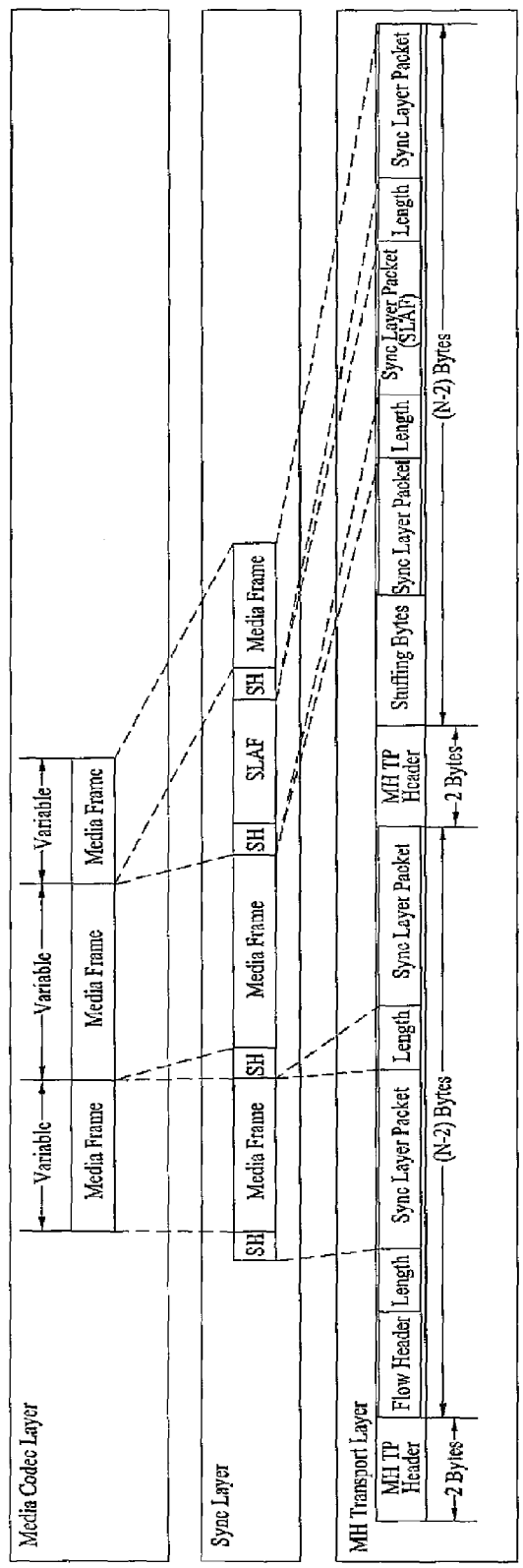
FIG. 30 is a view showing a process of packetizing sync layer packets in an MH transport layer according to an embodiment of the present invention.

FIG. 30 is a view showing a process of packetizing sync layer packets in an MH transport layer according to an embodiment of the present invention.

FIG. 30 shows a process of interfacing data for real time applications in the sync layer via the media codecs layer and packetizing the data in the MH transport layer in the form of a packet having a transmission format suitable for the MH system according to the present invention. At this time, the interfacing process will cite the description of FIG. 29. Hereinafter, the process of packetizing the data to the transmission packet in the MH transport layer after interfacing will be mainly described.

Referring to FIG. 30, in the MH transport layer, an MB transport packet header (2 bytes) are prefixed to at least one flow packet (N-2 bytes) so as to be packetized to one MH transport packet (N bytes). The flow packet is divided into a flow packet header and a flow packet payload. The flow packet header (5 bytes) will be described later with reference to FIG. 31. The flow packet payload (N-2-5 bytes) has a variable length. One flow packet payload may be configured by packets divided from the sync layer packet packetized in the sync layer of FIG. 29 or may be configured by several sync layer packets by the length of the flow packet payload. The flow packet payload may include a length field (16 bits) indicating the length of the sync layer packet included in the flow packet payload.

In the header of a first MH transport packet of the MH transport packets, for example, a type indicator field may be "000". If the divided flow packet is N-2 bytes or less, stuffing bytes may be added. The pointer field of the MH transport packet header may indicate a start point of the flow packet header.

As described below, the flow packet is divided into a flow packet header and a flow packet payload. The flow packet payload includes a length field indicating the length of the sync layer packet which is packetized in the sync layer and configured by the sync packet header and the media frame.

Referring to FIG. 30, one MH transport packet (MH TP) includes at least one flow packet and one flow packet may include a plurality of sync layer packets.

If the length of each of the sync layer packets is not known, the receiver cannot process the sync layer packet although receiving the sync layer packets. Accordingly, the length field is used to indicate the length of the sync layer packet in order to process the sync layer packet.

Figure 31:
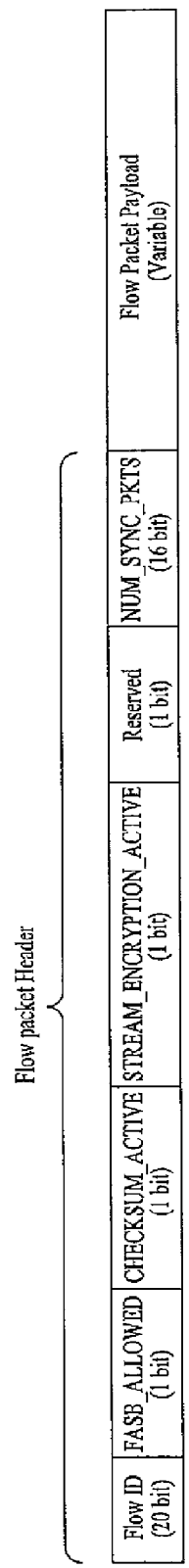
FIG. 31 is a view showing an embodiment of the format of a flow packet of FIG. 30.

FIG. 31 is a view showing the format of a flow packet according to an embodiment of the present invention. As described above, the flow packet is divided into the flow packet header and the flow packet payload.

Hereinafter, the flow packet header will be described. The flow packet header includes a Flow ID field (20 bits) for identifying the flow packet, a CHECKSUM_ACTIVE field (1 bit) indicating whether or not cyclic redundancy check (CRC) is applied to the flow packet, an NUM_SYNC_PKTS field (1 bit) indicating the number of sync layer packets transmitted via the flow packet payload, an FD_FLOW_TYPE field (1 bit) indicating the type of the flow packet, an FASB_ALLOWED field (1 bit) indicating whether or not the flow packet is transmitted over at least one RS frame, and a STREAM_ENCRYPTION_ACTIVE field (16 bits) indicating whether or not encryption is applied to the flow packet payload. If the flow packet is a real time application flow packet, the value of the FASB_ALLOWED field may be set to "FALSE".

In the present invention, the values of the fields are arbitrarily set by the applicant and may be changed.

The flow packet is packetized to the MH TPs in the MH transport layer and is transmitted via the MH physical layer.

Accordingly, the RS frame handler 2620 of the receiver shown in FIG. 26 searches for the MH TP header having the above-described configuration, parses the MH TPs of which the type indicator of the header is "010", sends the packets to the flow packet handler 2619. The flow packet handler 2619 extracts and sends the sync layer packets to the sync layer handler 2632.

Figure 32A:
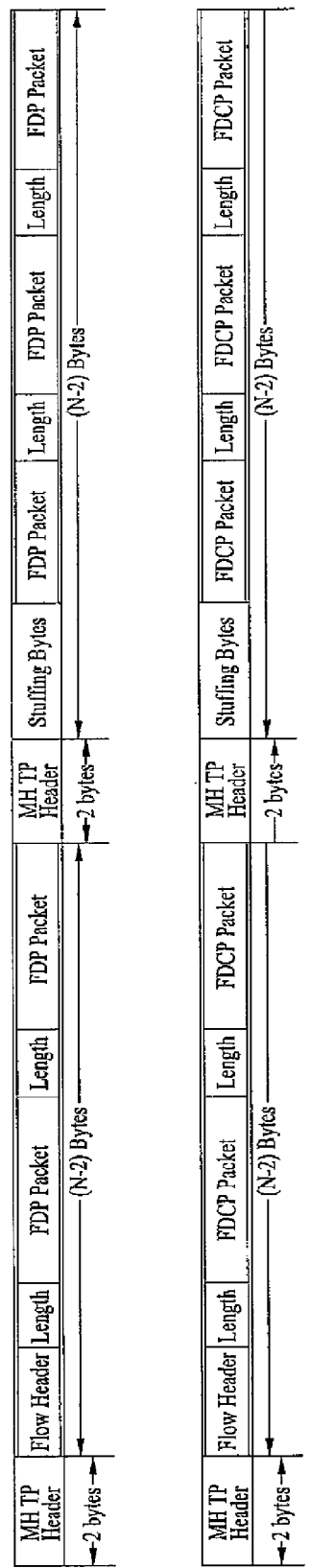
FIG. 32*a* is a view showing the configuration of a file delivery protocol (FDP) packet and a file delivery control protocol (FDCP) packet packetized in an MH transport layer according to an embodiment of the present invention.

Subsequent to the process of packetizing the sync layer packets, a process of packetizing file delivery layer packets will be described. FIG. 32a is a view showing the configuration of a file delivery protocol (FDP) packet and a file delivery control protocol (FDCP) packet packetized in an MR transport layer according to an embodiment of the present invent ion.

The file delivery layer functions as an interface between an MH transport layer and a non-real time files layer, for transmission of data for non-real time applications.

The file delivery layer may deliver the FDP packet and the FDCP packet for file delivery control to the MH transport layer as different flow packets. At this time, the FDP and the FDCP packets are packetized to the MH TPs and the configurations thereof are shown in FIG. 32a (FDP and the FDCP packets).

Figure 32B:
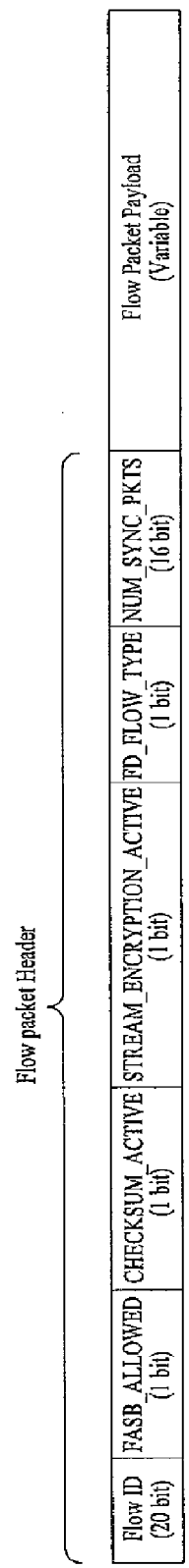
FIG. 32*b* is a view showing an embodiment of the format of the flow packet of FIG. 32*a*.

Since the process of packetizing the FDP packet and the FDCP packet in the MH transport layer is similar to the process of packetizing the sync layer packets of FIGS. 29 to 31, the common portions will cite the above description and the detailed description thereof will be omitted. Accordingly, referring to FIG. 32b, the fields values of the flow packet header will be applied similar to the sync layer. The flow packet payload having the variable length includes the length and the FDP packet or the length and the FDCP packet.

Figure 33:
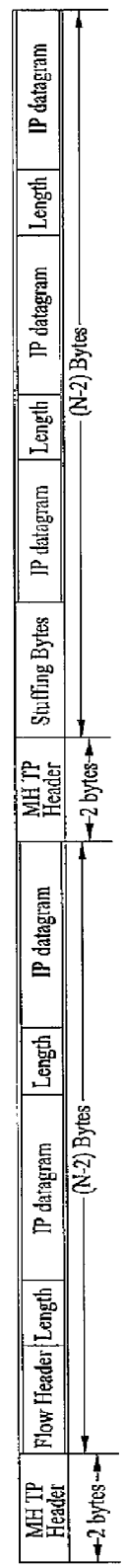
FIG. 33 is a view showing IP datagram packets packetized in an MH transport layer according to an embodiment of the present invention.

Finally, subsequent to the processes of packetizing the sync layer packets and the file delivery layer packets, a process of packetizing IP adaptation layer packets will be described. FIG. 33 is a view showing of IP datagram packets packetized in an MH transport layer according to an embodiment of the present invention.

The IP adaptation layer functions as an interface between the IPv4/IPv6 layer and the MH transport layer, for transmission of data for the IP datacast applications.

The IP adaptation layer may deliver the IP datagrams to the MH transport layer as different flow packets. The IP datagrams are packetized to the MH TPs. FIG. 33 shows the configuration of the packetized IP datagrams.

Figure 34:
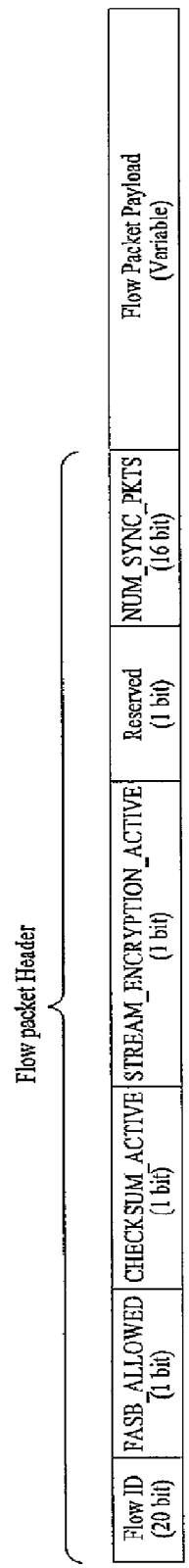
FIG. 34 is a view showing an embodiment of the format of the flow packet of FIG. 33.

The process of packetizing the IP datagrams in the MH transport layer is similar to the process of the packetizing the sync layer packets, the common portions will cite the above description and the detailed description thereof will be omitted. The values configuring the header of FIG. 34 may be properly defined according to the IP datagrams. The flow packet payload includes the IP datagram and the length information of the IP datagram.

Next, in association with the signaling information of the data for the MediaFLO service, a service map table-MH (SMT-MH) according to another embodiment of the present invention will be described. FIG. 35 is a view showing the syntax of the bitstream of a service map table according to another embodiment of the present invention.

Among the MH TPs transmitted via the RS frame shown in FIG. 27, an MH TP of which a type indicator is set to "000" is located at a foremost side of the RS frame, and a service map table including signaling data describing the data structure of the RS frame is transmitted via the MH TP located at the foremost side of the RS frame.

The service map table delivers information on the flow packets belonging to the MH services transmitted via the RS frame to the receiver. The service map table may be processed by the non-IP MH signaling decoder 2625 of the MH receiver of FIG. 26.

The service map table delivers information on the start and the end of the MH TPs belonging to the MH services transmitted via the RS frame so as to enable the RS frame handler 2620 to extract desired MH service data although the receiver does not have the IDs of the MH services.

The embodiment of the service map table of FIG. 35 is written according to the MPEG-2 short form, but may be written according to other short forms. The same contents as the service map table of FIG. 17 will cite the above description and the portions associated with the present embodiment will be mainly described.

Referring to FIG. 35, a first_MH_TP_num field indicates a first MH TP among several MH TPs including the flow packets and a last_MH_TP_num field indicates a last MH TP.

Figure 36:
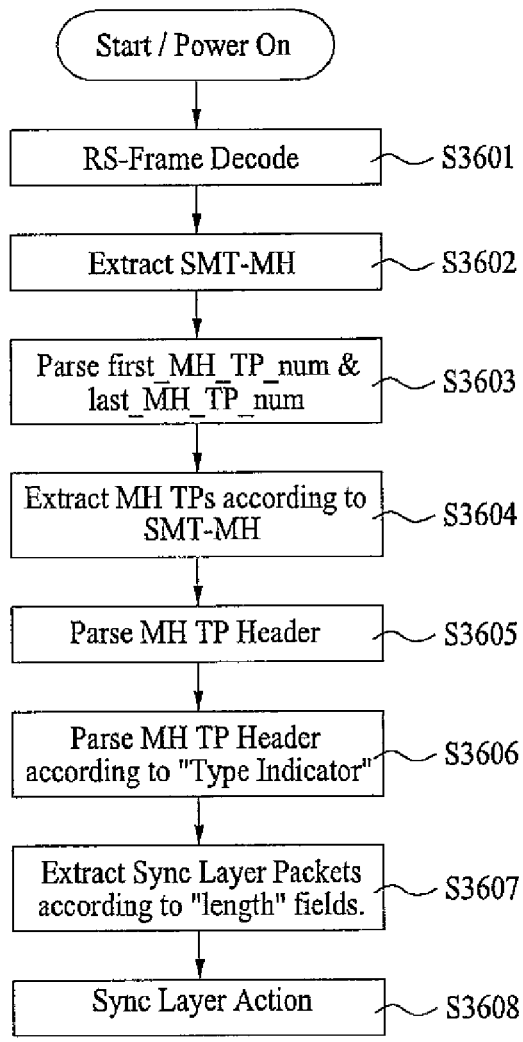
FIGS. 36 to 38 are views showing embodiments of a data processing process according to the present invention.
Figure 37:
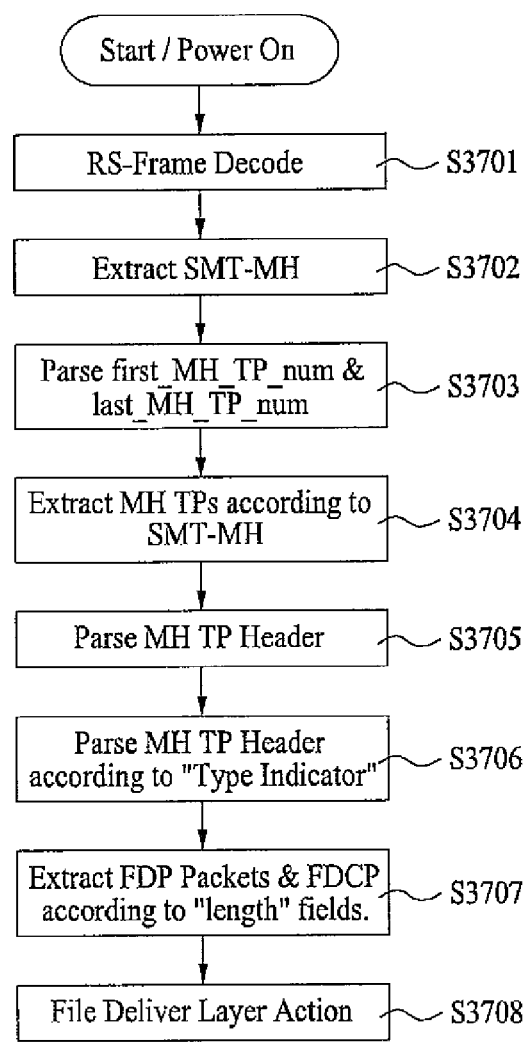
Figure 38:
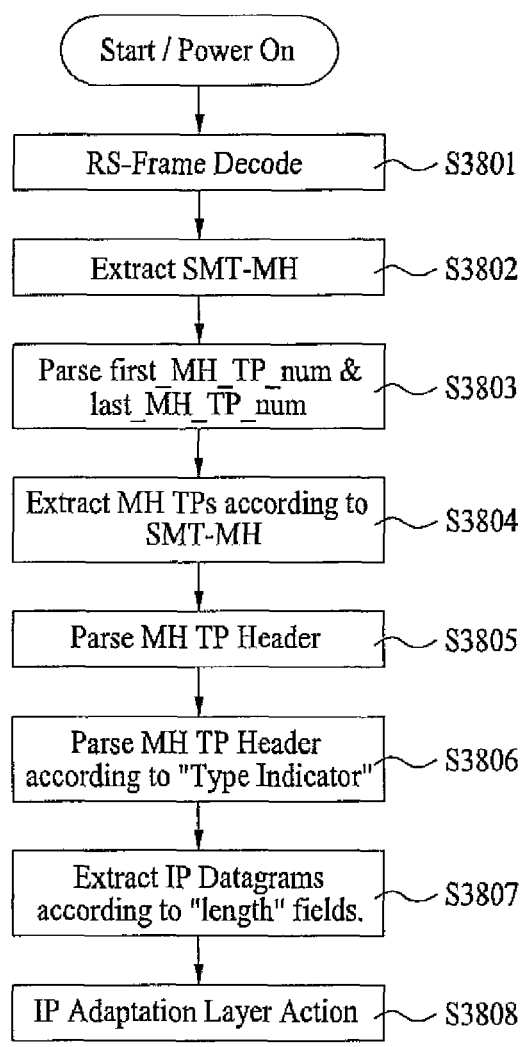

Hereinafter, a process of extracting and processing data transmitted via the MH TP layer in the MH service in order to provide a broadcast or service will be described. FIGS. 36 to 38 are views showing an embodiment of a data processing process according to the present invention.

When the power of the MH receiver is turned on, the RS frame in the received broadcast or service is decoded (S3601).

The SMT-MH including the signaling information of the data for the MediaFLO service is extracted from the decoded RS frame (S3602).

The steps S3601 and S3602 may be, for example, performed by the RS frame handler 2620 of the MH receiver shown in FIG. 26.

If the SMT-MH including the signaling information is extracted in the step S3602, the first_MH_TP_num field and the last_MH_TP_num field are parsed from the extracted SMT-MH section (S3603).

The step S3603 may be, for example, performed by the non-IP MH signaling decoder 2625 of the MH receiver shown in FIG. 26.

The MH TPs are extracted from the RS frame on the basis of the SMT-MH extracted in the step S3602 and the first_MH_TP_num field and last_MH_TP_num field parsed in the step S3603 (S3604).

The headers of the extracted MH TPs are parsed (S3605).

The steps S3604 and S3605 may be, for example, performed by the RS frame handler 2620 of the MH receiver shown in FIG. 26.

In the step S3605, the type indicators in the headers of the parsed MR TPs are extracted. The flow packet headers are extracted and parsed on the basis of the extracted type indicators (S3606). For example, the flow packet includes the sync layer packets if the value of the extracted type indicator is "010", includes the FDP packet and the FDCP packet if the value of the extracted type indicator is "011", and includes the IP datagram packets if the value of the extracted type indicator is "100".

Hereinafter, the flow packet of which the type indicator is "010", that is, the flow packet including the sync layer packets, will be described with reference to FIG. 36.

The lengths of the sync layer packets included in the flow packet payload are extracted from the flow packet headers parsed in the step S3606 and the sync layer packets are extracted according to the extracted lengths (S3607).

The steps S3606 and S3607 may be, for example, performed by the flow packet handler 2619 of the MH receiver shown in FIG. 26.

A sync layer action is performed using the sync layer packets extracted in the step S3607 (S3608).

The step S3608 may be, for example, performed by the sync layer handler 2632 of the MH receiver shown in FIG. 26.

By performing the above-described process, the sync layer packets for the MediaFLO service included in the MH TPs are processed according to the protocol stack of the MH system and are provided to the user.

Next, the flow packet of which the extracted type indicator is "011", that is, the flow packet including the FDP packet and the FDCP packet, will be described with reference to FIG. 37. The steps S3701 to S3705 of FIG. 37 are equal to the steps S3601 to S3605 and will cite the description of FIG. 36. Hereinafter, the description will be made from the step S3706.

Instead of the sync layer packets, if the FDP packet and the FDCP packet are included in the flow packet according to the value of the extracted type indicator, the headers of the flow packets including the FDP packet and the FDCP packet are extracted and parsed (S3706).

The lengths of the FDP packet and the FDCP packet included in the flow packet payload are extracted from the flow packet headers parsed in the step S3706 and the FDP packet and the FDCP packet are extracted according to the extracted lengths (S3707).

The steps S3706 and S3707 may be, for example, performed by the flow packet handler 2619 of the MH receiver shown in FIG. 26.

A file delivery layer action is performed using the FDP and FDCP packets extracted in the step S3707 (S3708).

The step S3708 may be, for example, performed by the file delivery layer handler 2633 of the MH receiver shown in FIG. 26.

By performing the above-described process, the FDP and FDCP layer packets for the MediaFLO service included in the MH TPs are processed according to the protocol stack of the MH system and are provided to the user.

Finally, the flow packet of which the extracted type indicator is "100", that is, the flow packet including the IP datagrams, will be described with reference to FIG. 38. The steps S3801 to S3805 of FIG. 38 are equal to the steps S3601 to S3605 and will cite the description of FIG. 36. Hereinafter, the description will be made from the step S3806.

Instead of the sync layer packets or the FDP and FDCP packets, if the IP datagrams are included in the flow packet according to the value of the extracted type indicator, the headers of the flow packets including the IP datagrams are extracted and parsed (S3806).

The lengths of the IP datagrams included in the flow packet payload are extracted from the flow packet headers parsed in the step S3806 and the IP datagrams are extracted according to the extracted lengths (S3807).

An IP adaptation layer action is performed using the IP datagrams extracted in the step S3807 (S3808).

By performing the above-described process, the IP datagrams for the MediaFLO service included in the MH TPs are processed according to the protocol stack of the MH system and are provided to the user.

The blocks configuring the MH receiver for performing the steps of FIG. 38 are equal to the blocks described with reference to FIG. 35.

According to the present invention, the protocol stack for transmitting/receiving the service data having other formats instead of the existing MH format can be defined. Accordingly, various broadcast services can be provided via the MH system and various services can be provided to the user such that the user has a huge selection of the service.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed:

1. A method of processing a broadcast signal, the method comprising:
    encoding broadcast data and service signaling information by an encoder; and
    transmitting the broadcast signal having a signal frame including the encoded broadcast data and the encoded service signaling information by a transmitter,
    wherein the signal frame includes a part for fast service acquisition information providing accessing information of the service signaling information,
    wherein the fast service acquisition information include service type information, service protection information and channel information of a service, wherein the service signaling information include access information of service components.

2. The method of claim 1, the broadcast signal further includes data for non-real time service.

3. The method of claim 2, the method further includes:
    generating by a generator a plurality of packets including the broadcast data, the service signaling information and the data for non-real time service.

4. The method of claim 3, wherein the broadcast data and the service signaling information are encapsulated into UDP/IP packets.

5. An apparatus of processing a broadcast signal, the method comprising:
    an encoder to encode broadcast data and service signaling information; and
    a transmitter to transmit the broadcast signal having a signal frame including the encoded broadcast data and the encoded service signaling information,
    wherein the signal frame includes a part for fast service acquisition information providing accessing information of the service signaling information,
    wherein the fast service acquisition information include service type information, service protection information and channel information of a service, wherein the service signaling information include access information of service components.

6. The apparatus of claim 5, the broadcast signal further includes data for non-real time service.

7. The apparatus of claim 6, the apparatus further includes:
    a generator to generate a plurality of packets including the broadcast data, the service signaling information and the data for non-real time service.

8. The apparatus of claim 7, wherein the broadcast data and the service signaling information are encapsulated into UDP/IP packets.

* * * * *